(12) United States Patent
Pack et al.

(10) Patent No.: US 8,078,338 B2
(45) Date of Patent: Dec. 13, 2011

(54) SYSTEM AND METHOD FOR BEHAVIOR BASED CONTROL OF AN AUTONOMOUS VEHICLE

(75) Inventors: Robert Todd Pack, Nashua, NH (US); James Allard, Newton, MA (US); David S. Barrett, Needham, MA (US); Misha Filippov, Arlington, MA (US); Selma Svendsen, Melrose, MA (US)

(73) Assignee: iRobot Corporation, Burlington, MA (US)

( * ) Notice: Subject to any disclaimer, the term of this patent is extended or adjusted under 35 U.S.C. 154(b) by 709 days.

(21) Appl. No.: 10/972,081

(22) Filed: Oct. 22, 2004

(65) Prior Publication Data

US 2006/0089765 A1    Apr. 27, 2006

(51) Int. Cl.
G05D 1/00 (2006.01)
G06F 7/00 (2006.01)

(52) U.S. Cl. .......... 701/1; 701/36; 701/41; 701/45; 701/48; 701/51; 701/52; 701/53; 701/65; 701/70; 701/79; 701/83; 701/84; 701/87; 701/91

(58) Field of Classification Search .......... 701/23, 701/24, 28; 318/587
See application file for complete search history.

(56) References Cited

U.S. PATENT DOCUMENTS

| | | | | |
|---|---|---|---|---|
| 4,482,960 A | * | 11/1984 | Pryor | 701/28 |
| 4,862,373 A | * | 8/1989 | Meng | 701/209 |
| 4,897,640 A | | 1/1990 | Rapoen et al. | |
| 4,986,384 A | | 1/1991 | Okamoto et al. | |
| 5,076,382 A | | 12/1991 | Vaughn et al. | |
| 5,229,941 A | | 7/1993 | Hattori et al. | |
| 5,233,530 A | | 8/1993 | Shimada et al. | |
| 5,245,422 A | | 9/1993 | Borcherts et al. | |
| 5,448,479 A | * | 9/1995 | Kemner et al. | 701/23 |
| 5,469,356 A | | 11/1995 | Hawkins et al. | |
| 5,485,892 A | | 1/1996 | Fujita et al. | |
| 5,586,030 A | | 12/1996 | Kemner et al. | |
| 5,646,843 A | | 7/1997 | Gudat et al. | |
| 5,684,696 A | | 11/1997 | Rao et al. | |
| 5,774,069 A | | 6/1998 | Tanaka et al. | |
| 5,784,023 A | | 7/1998 | Bluege | |

(Continued)

FOREIGN PATENT DOCUMENTS

EP    0 601 728    6/1994

(Continued)

OTHER PUBLICATIONS

Partial International Search Report for International Application No. PCT/US2005/037918, mailed from the International Search Authority on Mar. 30, 2006, 2 pgs.

(Continued)

Primary Examiner — Khoi Tran
Assistant Examiner — Bhavesh V Amin
(74) Attorney, Agent, or Firm — Goodwin Procter LLP

(57) ABSTRACT

System and method for behavior based control of an autonomous vehicle. Actuators (e.g., linkages) manipulate input devices (e.g., articulation controls and drive controls, such as a throttle lever, steering gear, tie rods, throttle, brake, accelerator, or transmission shifter) to direct the operation of the vehicle. Behaviors that characterize the operational mode of the vehicle are associated with the actuators. The behaviors include action sets ranked by priority, and the action sets include alternative actions that the vehicle can take to accomplish its task. The alternative actions are ranked by preference, and an arbiter selects the action to be performed and, optionally, modified.

15 Claims, 10 Drawing Sheets

U.S. PATENT DOCUMENTS

| | | | |
|---|---|---|---|
| 5,906,645 | A | 5/1999 | Kagawa et al. |
| 5,987,364 | A | 11/1999 | Le Gusquet et al. |
| 6,037,901 | A | 3/2000 | Devier et al. |
| 6,059,063 | A | 5/2000 | Shimizu et al. |
| 6,068,352 | A | 5/2000 | Kulkarni et al. |
| 6,072,248 | A | 6/2000 | Muise et al. |
| 6,151,239 | A | 11/2000 | Batra |
| 6,151,539 | A | 11/2000 | Bergholz et al. |
| 6,157,887 | A | 12/2000 | Zittlau |
| 6,213,567 | B1 | 4/2001 | Zittlau et al. |
| 6,223,110 | B1 | 4/2001 | Rowe et al. |
| 6,249,215 | B1 | 6/2001 | Dilz et al. |
| 6,292,725 | B1 * | 9/2001 | Kageyama et al. ............. 701/30 |
| 6,341,594 | B1 | 1/2002 | Linden et al. |
| 6,370,471 | B1 | 4/2002 | Lohner et al. |
| 6,438,491 | B1 | 8/2002 | Farmer |
| 6,442,476 | B1 | 8/2002 | Poropat et al. |
| 6,452,348 | B1 * | 9/2002 | Toyoda ............................ 318/3 |
| 6,453,223 | B1 | 9/2002 | Kelly et al. |
| 6,549,130 | B1 | 4/2003 | Joao |
| 6,557,909 | B2 | 5/2003 | Morris |
| 6,560,511 | B1 * | 5/2003 | Yokoo et al. .................. 700/245 |
| 6,633,800 | B1 * | 10/2003 | Ward et al. ........................ 701/2 |
| 6,751,535 | B2 | 6/2004 | Mori et al. |
| 6,760,654 | B2 | 7/2004 | Beck |
| 6,778,097 | B1 | 8/2004 | Kajita et al. |
| 6,813,557 | B2 | 11/2004 | Schmidt et al. |
| 6,902,021 | B2 | 6/2005 | Kikuchi et al. |
| 6,945,346 | B2 | 9/2005 | Massen et al. |
| 7,015,831 | B2 | 3/2006 | Karlsson et al. |
| 7,266,532 | B2 * | 9/2007 | Sutton et al. .................... 706/12 |
| 7,278,567 | B2 | 10/2007 | Ferguson et al. |
| 7,305,294 | B2 | 12/2007 | Bate et al. |
| 2002/0032511 | A1 | 3/2002 | Murakami et al. |
| 2002/0104300 | A1 | 8/2002 | Hunt |
| 2004/0158355 | A1 | 8/2004 | Holmqvist et al. |
| 2004/0210345 | A1 | 10/2004 | Noda et al. |

FOREIGN PATENT DOCUMENTS

| | | |
|---|---|---|
| EP | 0681230 | 11/1995 |
| EP | 0835797 | 4/1998 |
| EP | 1462899 | 9/2004 |
| GB | 2 332 286 | 1/1999 |
| GB | 2339869 | 2/2000 |
| GB | 2400454 | 10/2004 |
| JP | 64-46111 | 2/1989 |
| JP | 3-282712 | 12/1991 |
| JP | 8-156641 | 6/1996 |
| JP | 9-258826 | 10/1997 |
| JP | 09258826 | 10/1997 |
| WO | WO-99/16005 A2 | 4/1999 |
| WO | WO-02/061515 | 8/2002 |

OTHER PUBLICATIONS

International Search Report for International Application No. PCT/US2005/037918, mailed from the International Search Authority on Aug. 4, 2006, 9 pgs.

De Campos, Institute of Electrical and Electronics Engineers, "Perception Planning as a Distributed Decision-Making Process," Oct. 17-20, 1993, vol. 3, pp. 611-616.

Combined Search Report and Examination Report under Sections 17 and 18(3) for British Patent Application No. GB0701806.2, dated Apr. 25, 2007, (4 pages).

Written Opinion for International Application No. PCT/US2005/037918, mailed on Mar. 30, 2006, 9 pgs.

Further Examination Report for British Patent Application No. GB 0701810.4, dated Jun. 2, 2008, 2 pgs.

Combined Search and Examination Report under Sections 17 and 18(3) for British Patent Application No. GB 0521352.5, dated Feb. 10, 2006, 8 pgs.

Further Examination Report for British Patent Application No. GB 0521352.5, dated Apr. 25, 2007, 1 pg.

Further Examination Report for British Patent Application No. GB 0521352.5, dated Jul. 24, 2007, 1 pg.

Examination Report for European Patent Application No. 05815821.3, dated Jul. 21, 2008, 7 pages.

Arkin, Ronald C., "Behavior Based Robotics," The MIT Press, 1998, pp. 24-27, 66-67, 73-74, 111-113, and 129-130.

Examination Report for European Patent Application No. 05815821.3, dated Jul. 14, 2009, 3 pages.

Supplementary European Search Report and Opinion for European Patent Application No. 10150583.2, mailed Feb. 11, 2010, 11 pages.

Extended European Search Report and Opinion for European Patent Application No. 10182588.3, mailed Dec. 3, 2010, 7 pages.

Extended European Search Report and Opinion for European Patent Application No. 10182609.7, mailed Jan. 17, 2011, 6 pages.

Examination Report for European Patent Application No. 10150583.2, mailed Mar. 16, 2011, 5 pages.

Combined Search Report and Examination Report under Sections 17 and 18(3) for British Patent Application No. GB0701810.4, dated Apr. 2, 2007, (6 pages).

* cited by examiner

SYSTEM AND METHOD FOR BEHAVIOR BASED CONTROL OF AN AUTONOMOUS VEHICLE

FIELD OF THE INVENTION

The present invention relates generally to control of unmanned ground vehicles and, more specifically, to variations in the control of unmanned ground vehicles in response to environmental changes or operator intervention.

BACKGROUND OF THE INVENTION

Vehicles and equipment that operate with little or no operator intervention are desirable partly because they remove the operator from harm's way in dangerous applications and because they offer direct labor cost savings in commercial applications. In many instances, this limited intervention is exemplified by an operator removed from the confines of the vehicle itself and placed in a location with a remote control device that interfaces with and controls the vehicle. In this configuration, however, the operator typically must directly and continuously monitor the vehicle and its surrounding environment, adjusting, for example, vehicle speed and direction, as needed. In particular, when a task is complex, the operator must carefully monitor the vehicle or equipment to the point where any simplification of the operator's tasks is negated by the high level of concentration required to ensure the vehicle avoids obstacles, hazards, and other terrain features in its path, thereby preventing accidents. This requires considerable effort by the operator, a significant investment in skilled operator training, and places severe limitations on mission duration and objectives.

In a typical environment, a vehicle can encounter any number of unforeseen hazards. A vehicle can also create or exacerbate a hazard. In either case, there is the potential that the vehicle may endanger persons or property. Accordingly, an operator generally pays particular attention to events that may result in dangerous conditions. This additional safety concern negatively affects mission effectiveness because it directs the operator's attention away from the particulars of the task the vehicle is performing. Additionally, an operator may become overwhelmed by the degree of oversight and attention required and may fail to recognize one or more obstacles or hazards in the path of the vehicle, potentially resulting in an accident.

From the foregoing, it is apparent that there is a direct need for efficient, autonomous control of a vehicle or equipment that relieves the operator of most, if not all, of operational oversight. The vehicle or equipment needs to accomplish its assigned tasks while compensating for the environment in an autonomous fashion but still be responsive to the attempts by an operator to assume control. The vehicle must also ensure the safety of the its surroundings.

SUMMARY OF THE INVENTION

The present invention provides a system and method for behavior based control of an autonomous vehicle. While operating autonomously, the vehicle is aware of its surroundings, particularly the location and character of terrain features that may be obstacles. Because these terrain features can represent hazards to the vehicle, the vehicle preferably compensates by altering its trajectory or movement.

The invention features a method for the behavior based control of an autonomous vehicle where several behaviors are associated with the actuators that manipulate input devices that direct the vehicle. An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the operator input device may be a throttle, and the input device may be the throttle body. Although a human operator typically accesses and manipulates the operator input device, the input device need not be accessible or operable by the human operator.

A behavior is a program that proposes an action based on sensor data, operator input, or mission goals. Actions are typically grouped into action sets, and the action sets are generally prioritized. The actions within an action set are termed "alternative actions," and each alternative action generally has a corresponding preference. The preferences allow for the ranking of the alternative actions.

Multiple behaviors continuously propose actions to an arbiter. The arbiter continuously decides which behavior is expressed based on a weighted set of goals. The arbiter selects the action set with the highest priority, and also selects the alternative action from within the selected action set with the highest corresponding preference. A behavior based system can include many behaviors and multiple arbiters, and multiple arbiters can be associated with an actuator. Multiple arbiters associated with an actuator are sometimes referred to as "stacked arbiters." An actuator is typically a servo-system and transmission in physical contact with the existing input devices in the vehicle.

In some embodiments, the behaviors characterize the operational mode of the vehicle. These modes include; manned operation, remote unmanned tele-operation, assisted remote tele-operation, and autonomous unmanned operation. In the manned operation mode a vehicle operator sits in the vehicle cockpit and drives the vehicle using its traditional command input devices (e.g. steering wheel, brake, accelerator, throttle, etc.). In the remote unmanned tele-operation mode a dismounted operator or an operator in a chase vehicle drives the unmanned vehicle from a safe stand off distance through a portable operator control unit that allows the operator to directly command the vehicle. In the assisted remote tele-operation mode, the dismounted operator can engage "assistive behaviors" that facilitate mission execution. These assistive behaviors use the vehicles sensors, control system, and perception and localization subsystems to add short-term, safe, self-navigation functionality to the vehicle. Examples of assisted behaviors include active obstacle avoidance, circling in place and deploying payloads based on sensor input. Such an assist allows the operator to focus more on the mission and less on the continuous demand of driving. In the autonomous mode, the vehicle uses an arbitrated behavior based technique to perform a tactically significant mission. Examples of such missions include following a moving object at a fixed distance and travelling through a pre-recorded set of fixed GPS waypoints while actively performing obstacle avoidance. Each mode can include a set of alternative behaviors that the vehicle can take to accomplish its task. In some embodiments, the alternative behaviors are ranked by priority or preference and an arbiter selects the behavior to be performed. The behavior can then operate the corresponding vehicle control accordingly.

In some embodiments, the behaviors include trajectory sets and, in further embodiments, the behavior includes adjusting the translational velocity, or rotational velocity, or both, of the autonomous vehicle, typically in response to data received from sensors or a map of terrain features located around the vehicle.

Another aspect of the invention includes a system for behavior based operation of an autonomous vehicle that includes a controller, such as a microprocessor or microcontroller, that provides the host environment for the multiple resident behavior programs and the arbiter program and, in response to the behaviors, operates one or more vehicle controls using actuators. The controller also communicates with one or more localization or perception sensors, and using one or more localization and perception behaviors builds a vehicle centric terrain feature map. The controller runs the behavior system and specifies the actions to be performed.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1:
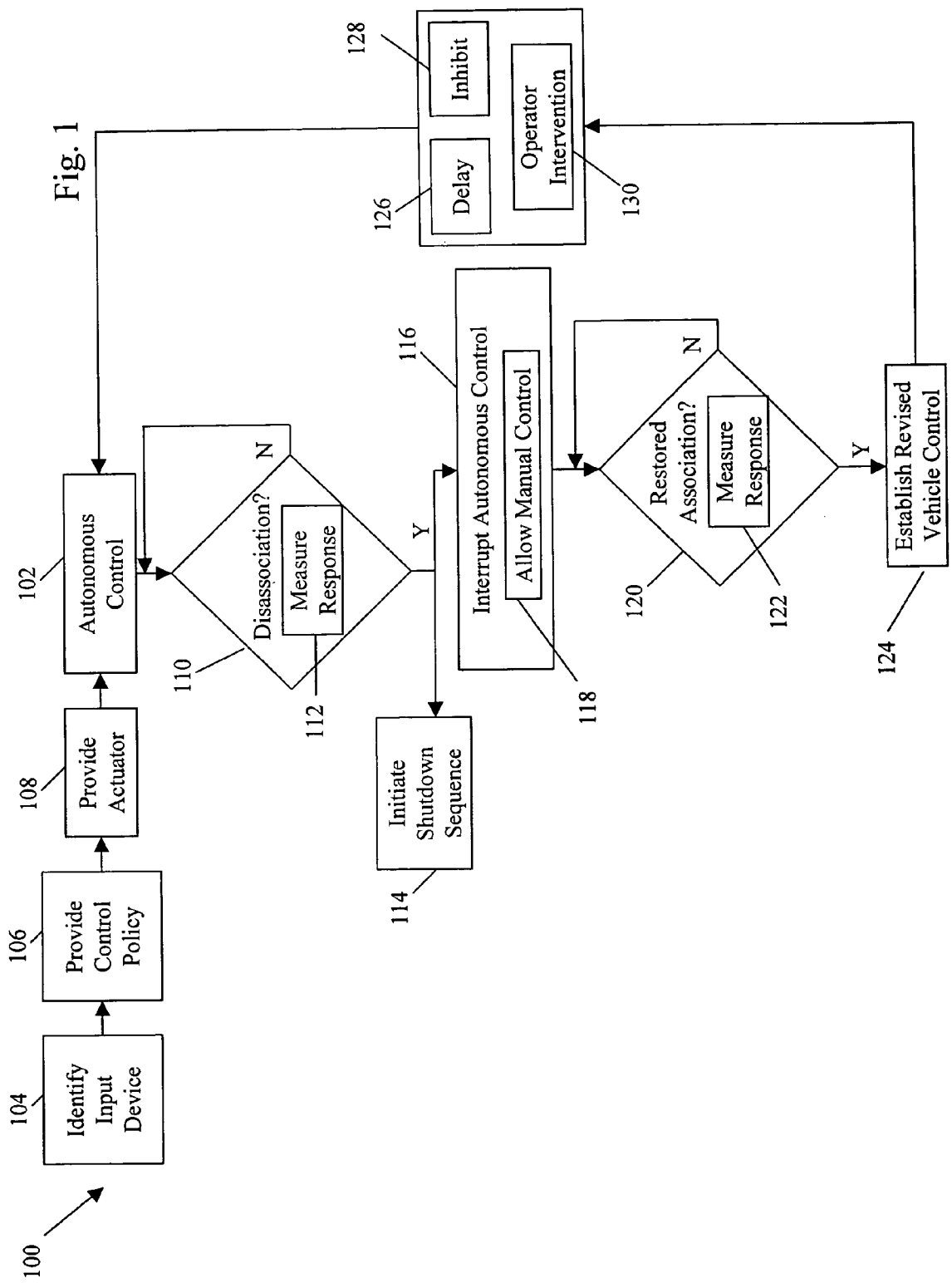
FIG. 1 is a flowchart depicting a method for interruptible autonomous control of a vehicle in accordance with an embodiment of the invention.

As shown in the drawings for the purposes of illustration, the invention may be embodied in systems and methods for controlling vehicles, where the systems and methods compensate, with little or no operator intervention, for changes in the environment around the vehicle. Embodiments of the invention enhance overall mission effectiveness and operating safety.

In brief overview, FIG. 1 is a flowchart depicting a method 100 for interruptible autonomous control of a vehicle in accordance with an embodiment of the invention. The method includes a step of first identifying one or more input devices in the vehicle (STEP 104). An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the operator input device can be a drive control. A drive control generally includes a throttle, brake, or accelerator, or any combination thereof. In other embodiments, the operator input device can be an articulation control. An articulation control generally operates equipment attached to the vehicle. This can include, for example, a control used to manipulate a blade on a bulldozer, or a tilling apparatus on a tractor. Although a human operator typically accesses and manipulates the operator input device, the input device need not be accessible or operable by the human operator.

Next, the method 100 includes the step of providing one or more control policies (STEP 106) corresponding to the input device. Generally, the control policies determine the manner in which the vehicle operates including, for example, whether the control of the vehicle will be autonomous, manual, or a combination thereof. In addition to the identification of the input devices and control policies, the invention also includes the step of providing one or more actuators (STEP 108) associated with one or more input devices. The actuator is typically an electromechanical device that manipulates the input device. Manipulation occurs by, for example, pushing, pulling, or turning the input device, or by any combination thereof. A result of this is the autonomous control of the vehicle. Furthermore, in an embodiment of the invention, the actuators still allow manual operation of the vehicle. In other words, the presence of actuators in the vehicle does not preclude manual operation of the corresponding input devices. In some embodiments, a linkage or other mechanical transmission associates the actuator with the corresponding input device. A linkage is generally apparatus that facilitates a connection or association between the input device and the actuator. A typical linkage is a lever and pivot joint, a typical transmission is a rack and pinion device.

Following the identification of the input device (STEP 104), providing the control policy (STEP 106), and providing the actuator (STEP 108), an embodiment of the invention provides autonomous control of a vehicle (STEP 102). Autonomous control allows a vehicle to be operated according to programmed instructions, with little or no operator intervention. Autonomous control typically includes "intelligence" that allows the vehicle to compensate for unforeseen events, such as an encounter with a terrain feature such as an obstacle. During autonomous control, an embodiment of the invention monitors the input devices and actuators for a disassociation therebetween (STEP 110). The disassociation is generally any break in a physical connection between the input device and the corresponding actuator. For example, the input device can be an operator input device, such as an accelerator pedal, connected to an actuator that is a rack and pinion device. An operator can disassociate the accelerator from the actuator by, for example, depressing the accelerator. In some embodiments, the disassociation is detected by measuring the response of one or more sensors (STEP 112).

On detection of the disassociation (STEP 110), autonomous control is interrupted in favor of other operational modes (STEP 116). For example, on detection of the disassociation, a system according to an embodiment of the invention initiates a vehicle shutdown sequence (STEP 114). This can occur when, for example, the vehicle operator depresses a "panic button," thereby allowing a controlled, safe shutdown of the vehicle.

In other embodiments, following detection of the disassociation (STEP 110), autonomous control is interrupted (STEP 116) to allow manual control (STEP 118). One example of this occurs when an operator wants to increase temporarily the speed of a vehicle that is under autonomous control. By depressing the accelerator, a system according to an embodiment of the invention relinquishes the autonomous control and allows the vehicle to accelerate according to the operator's preference.

After the interruption of autonomous control (STEP 116), different embodiments of the invention detect a restored association between the input device and the corresponding actuator (STEP 120). The reassociation is typically entails the reestablishment of the physical connection between the input device and the corresponding actuator. This is generally detected by measuring the response of one or more sensors (STEP 122). In the example discussed above, the reassociation would occur when the operator stops depressing the accelerator, thereby allowing the accelerator to reconnect with its actuator.

Following the reassociation, one embodiment of the invention establishes a revised vehicle control (STEP 124). The nature of the revised vehicle control depends on the control policy provided (STEP 106). For example, in some embodiments, the revised vehicle control includes returning to autonomous control (STEP 102). This can occur immediately. In other embodiments, returning to autonomous control (STEP 102) occurs after a delay (STEP 126). In different embodiments, the operator must first intervene (STEP 130) before the vehicle returns to autonomous control (STEP 102). This configuration provides, for example, a safety feature where the operator must confirm that returning the vehicle to autonomous control is reasonable and proper.

In certain embodiments, the control policy provided (STEP 106) includes preventing the vehicle from further autonomous control after the interruption of autonomous control (STEP 116). For example, in a tractor, an operator may want to stop the tilling apparatus and ensure that it can not restart automatically. When a system according to an embodiment of the invention detects a disassociation between the tiller control and the corresponding actuator (STEP 110), typically because the operator has manipulated the tiller control thereby disrupting the physical connection between the tiller control and the corresponding actuator, autonomous control is interrupted (STEP 116). Embodiments of the invention would detect the restored association between the tiller control and the corresponding actuator (STEP 120) when, for example, the operator released the tiller control, and then attempt to establish a revised vehicle control (STEP 124). Nevertheless, in this example, the control policy provided (STEP 106), includes inhibiting further autonomous control (STEP 128). Stated differently, in some embodiments, the control policy dictates, on a input device-by-input device basis, what actions are appropriate following the interruption of autonomous control. For certain input devices, such as the accelerator example discussed above, reestablishment of autonomous control is proper. For other input devices, however, safety or other considerations dictate that autonomous control not be restored.

Figure 2:
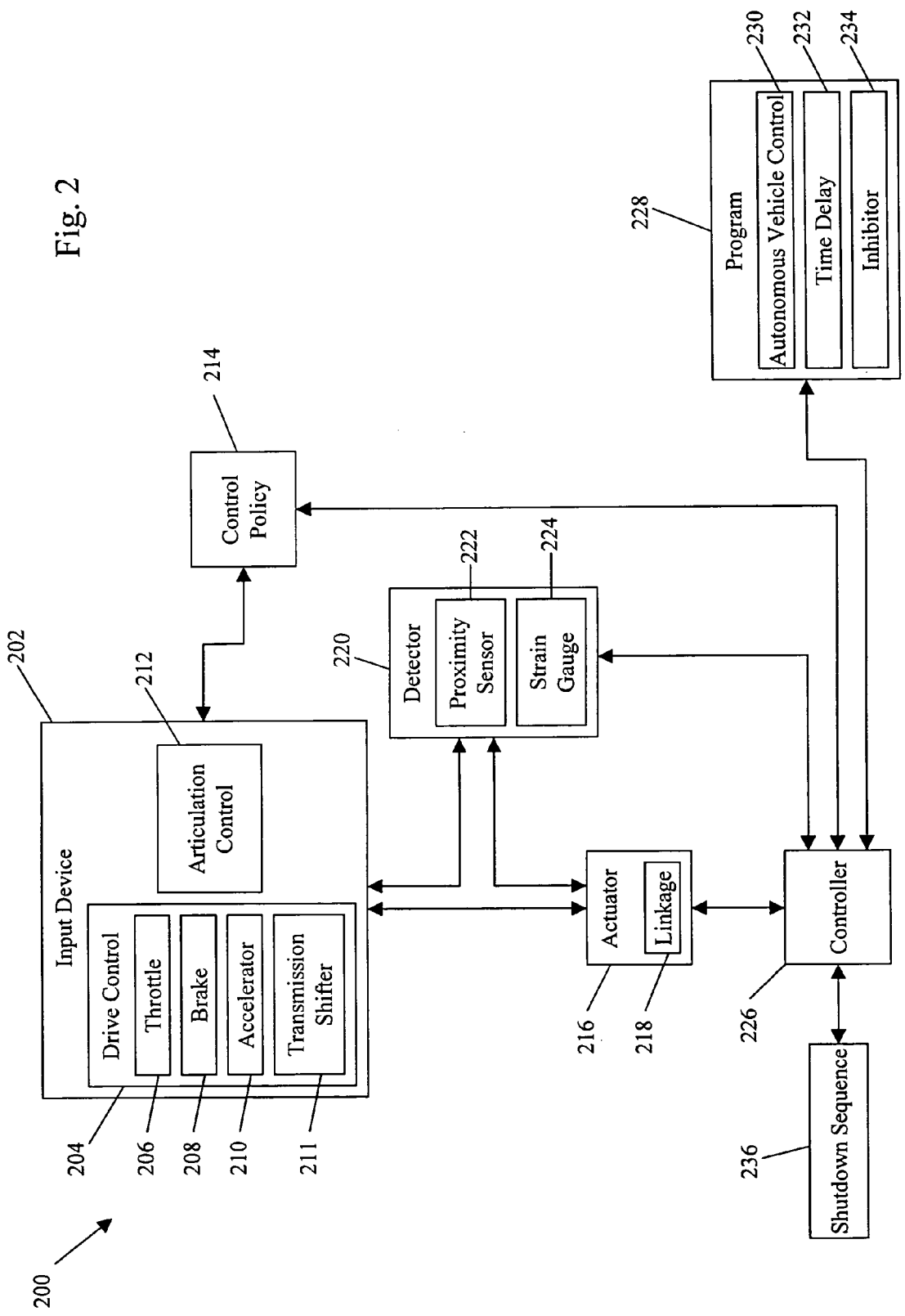
FIG. 2 is a block diagram depicting a system for interruptible autonomous control of a vehicle in accordance with an embodiment of the invention.

FIG. 2 is a block diagram that depicts a system 200 for interruptible autonomous control of a vehicle in accordance with an embodiment of the invention. The system 200 typically includes one or more input devices 202. An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the operator input device can be a drive control 204. A drive control generally includes a throttle 206, brake 208, accelerator 210, or transmission shifter 211, or any combination thereof. A typical input device 202 is a throttle body (not depicted), which is typically connected to the throttle 206. Other example input devices 202 include a steering gear (not depicted) and tie rods (not depicted). In other embodiments, the input device can include an articulation control 212.

The system 200 also includes one or more control policies 214 corresponding to the input device 202. Generally, the control policy 214 determines the manner in which the vehicle will operate, typically allowing for vehicle control under autonomous or manual conditions, or a combination thereof. The system 200 also includes one or more actuators 216 associated with the one or more input devices 202. Typically, the actuator 216 includes an electromechanical device that drives the input device 202. In one embodiment of the invention, the actuator 216 includes one or more linkages or other mechanical transmissions 218. Generally, a linkage provides the association (e.g., physical connection) between an actuator 216 and the associated input device 202. A typical linkage is a lever and pivot joint, a typical transmission is a rack and pinion device.

In some embodiments of the invention, the system 200 includes one or more detectors 220. The detector 220 discerns a disassociation between the input device 202 and the actuators 216. Typically the disassociation includes a break in contact or communication between the input device 202 and its associated actuator 216. By way of example, such contact or communication may be physical, or via electrical or mechanical communication, or any combination thereof. In another embodiment, a disassociation can include a separation between the input device 202 and the associated actuator 216. In an alternative embodiment, the detector 220 includes a proximity sensor 222, or a strain gauge 224, or both. After a disassociation between the input device 202 and the actuator 216 has occurred, the detector 220 discerns a restored association between the same. Generally, a restored association includes a renewed contact or communication between the input device 202 and its corresponding actuator 216. For example, such renewed contact or communication may be physical, or via electrical or mechanical communication, or any combination thereof.

The system 200 also includes one or more controllers 226 that, in some embodiments, are in communication with the actuators 216 and the detectors 220. The controller 226 is capable of interrupting autonomous control (STEP 116). The controller 226 executes a vehicle control program 228, based at least in part on the control policies 214. In some embodiments, the controller 226 is a microprocessor. In other embodiments, the controller 226 is a microcontroller.

In another embodiment, the vehicle control program 228 includes a module that provides for autonomous vehicle control 230. In another embodiment, the vehicle control program 228 includes a predetermined time delay module 232. In some embodiments, the vehicle control program 228 includes an inhibitor module 234 that prevents autonomous vehicle control. The inhibitor module 234 prevents autonomous vehicle control in the absence of operator intervention (STEP 130).

Other embodiments of a system according to the invention include a shutdown sequence 236 managed by the controller 226. The shutdown sequence is based at least in part on the disassociation between the input device 202 and its corresponding actuator 216. Typically, the shutdown sequence 236 includes a controlled stop of the vehicle in response to an emergency.

Figure 3:
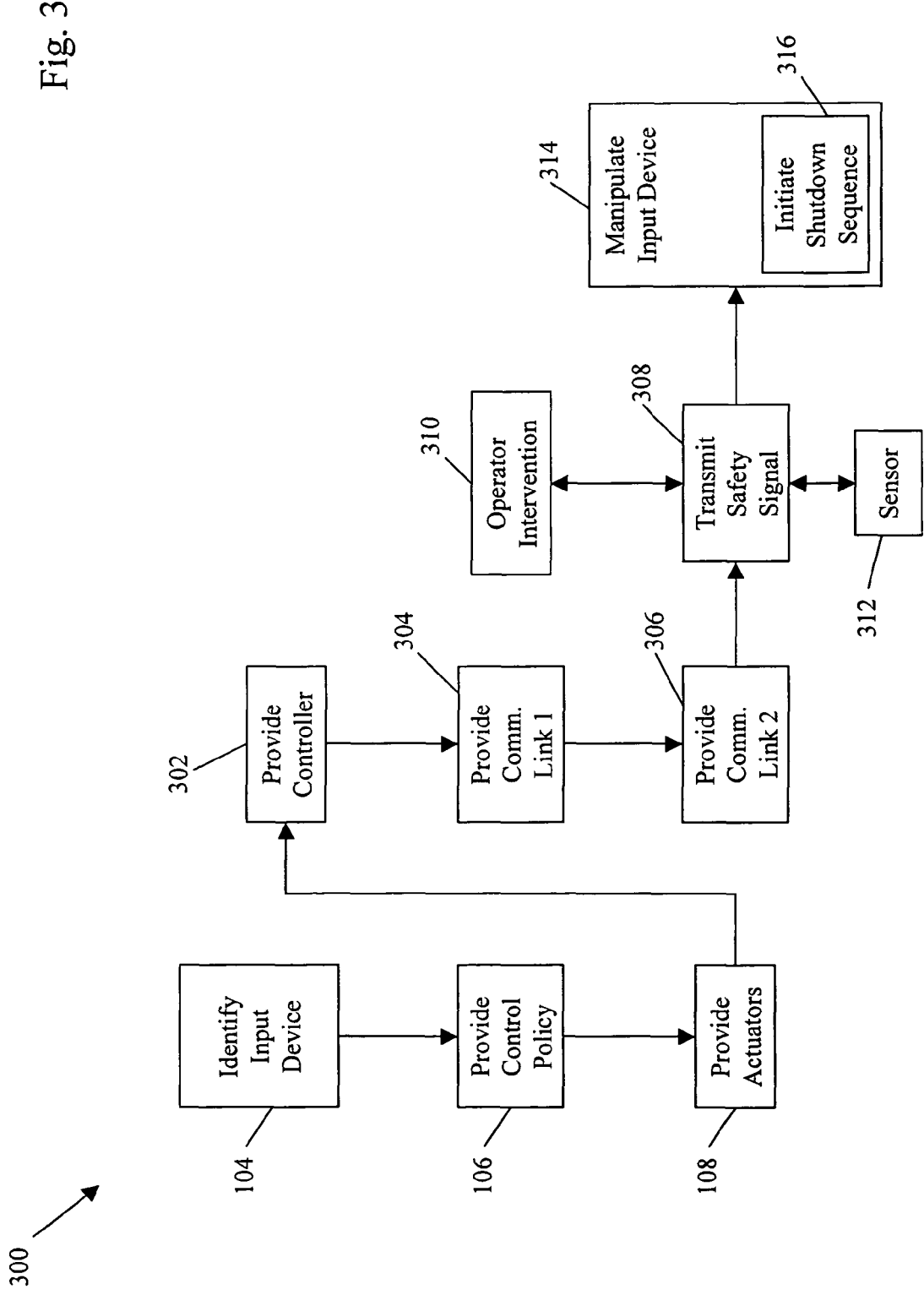
FIG. 3 is a flow chart depicting a method for processing a safety signal in an autonomous vehicle in accordance with an embodiment of the invention.

In brief overview, FIG. 3 is a flowchart depicting a method 300 for processing a safety signal in an autonomous vehicle in accordance with an embodiment of the invention. The method includes a step of first identifying one or more input devices in the vehicle (STEP 104). An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). Generally, an operator input device may be linked to or associated with an input device to control the operation of all or part of the vehicle. For example, the input device can be a drive control. A drive control generally includes a throttle, brake, or accelerator, or any combination thereof. In other embodiments, the input device can be an articulation control. An articulation control generally operates equipment attached to the vehicle. This can include, for example, a control used to manipulate a blade on a bulldozer, or a tilling apparatus on a tractor.

Next, the method 300 includes the step of providing one or more control policies (STEP 106) corresponding to the input device. Generally, the control policies determine the manner in which the vehicle operates, including, for example, whether the control of the vehicle will be autonomous, manual, or a combination thereof. In addition to the identification of the input devices and control policies, the invention also includes the step of providing one or more actuators (STEP 108) associated one or more input devices. The actuator is typically an electromechanical device that manipulates the input device. Manipulation occurs by, for example, pushing, pulling, or turning the input device, or by any combination thereof. A result of this is the autonomous control of the vehicle. Furthermore, in an embodiment of the invention, the manipulation of the input device by the actuators allow for a controlled shutdown of the vehicle.

Following the identification of the input device (STEP 104), providing the control policy (STEP 106), and providing the actuator (STEP 108), an embodiment of the invention includes the step of providing one or more controllers (STEP 302). A controller allows the vehicle to be operated according to programmed instructions and, in some embodiments, with little or no operator intervention. A controller typically includes "intelligence" that allows for any combination of manual or autonomous control of the vehicle. Furthermore, in at least one embodiment of the invention, the controller detects and processes a safety signal, and in another embodiment, the controller detects and processes a stop signal and a non-stop signal (i.e., a signal that indicates a "stop" has not been commanded). The non-stop signal is also represented by the absence of the stop signal.

Next, the method includes the step of providing a first communication link between the controller and each corresponding actuator (STEP 304). In one embodiment of the invention, the first communication link includes a network connection between the controller and each corresponding actuator. The network connection can be part of, for example, a local area network or wide area network. It can be a wired or wireless connection, and may provide access to the Internet. Typically, the network connection is part of a real-time control network that adheres to an industry standard (e.g., the "CAN" open standard). Generally, the first communication link connects, (for example, via a network) the actuators so the vehicle can change modes of operation. In one embodiment, the change in modes of operation is in response to the safety signal. For example, the safety signal may dictate that the vehicle stop moving, so the change in modes would include one or more actuators associated with the drive control manipulating the drive control to stop the vehicle. Generally, the first communication link is any electrical, mechanical, wired, wireless, or any combination thereof, communication between the controller and corresponding actuators. In addition to the first communication link, the method also includes the step of providing a second communication link between each corresponding actuator (STEP 306). In an embodiment of the invention, the second communication link includes one or more current loops. A current loop is typically a continuous wired connection with electrical current flowing through it. Components associated with the current loop detect or measure this electrical current, doing so directly or indirectly (e.g., by measuring a voltage drop across a resistive element). A variance of the current from an expected value (e.g., interruption of the current) is generally a signal that the current loop conveys. In embodiments of the invention, the second communication link conveys a manual mode signal, an autonomous mode signal, or any combination thereof. In yet another embodiment, the second communication link conveys a stop signal, non-stop signal (i.e., the absence of the stop signal), or any combination thereof. Typically, the second communication link is configured as a serial hardwire connection between the actuators. In other words, the second communication link progresses from one actuator to the next sequentially, forming a ring.

Next, an embodiment of the invention includes the step of transmitting the safety signal to each of the plurality of actuators via the first communication link, the second communication link, or any combination thereof (STEP 308). Generally, this communication may occur in any manner in which data is transmitted from one actuator to another. For example, the communication may be electrical, mechanical, wired, wireless, or any combination thereof. In some embodiments, the safety signal is transmitted in response to operator intervention (STEP 310). For example, an operator may depress an "emergency stop" button that triggers the transmission of the safety signal (STEP 308). In other embodiments, the safety signal is transmitted in response to the output of at least one sensor (STEP 312). This can occur if a sensor measures an instability in the vehicle, such as if the vehicle was about to overturn. The controller provided (STEP 302) interprets the output of the sensor, determines an unsafe condition has developed, and triggers the transmission of the safety signal (STEP 308).

In some embodiments, the vehicle enters a safe mode of operation on the detection of an emergency or safety signal that is communicated between the controller and each corresponding actuator via the first communication link. In other embodiments, the vehicle automatically enters a safe mode of operation on the detection of an emergency or safety signal that is communicated between corresponding actuators via the second communication link. Furthermore, in some embodiments there is redundant transmission of the safety signal via both the first communication link and second communication link. In any case, the safety signal is transmitted to the corresponding actuators, which respond accordingly.

Following the transmission of the safety signal (STEP 308) an embodiment of the invention includes the step of manipulating the input device (STEP 314) based at least in part on the corresponding control policy and the safety signal. Generally, the manipulation of the input device (STEP 314) may be the physical movement of an input device by its corresponding actuator in response to the safety signal to effect a change in vehicle mode of operation. In one embodiment of the invention, the manipulation of the input device (STEP 314) includes initiating a shutdown sequence (STEP 316) to shut down the vehicle. This can occur, for example, in emergency situations where the proper course of action is a controlled, safe, shutdown of the vehicle.

In some embodiments, the safety signal is transmitted in response to output of the sensors. For example, a sensor may indicate that the vehicle, (for example, a tractor) may be on a collision course with a terrain feature that is an obstacle, such as a rock or ditch. This indication may be in the form of a safety signal. Based at least in part on the safety signal, the controller will become informed of the obstacle, incorporate the proper control policy, and communicate with the associated actuators via the first communication link. The actuators will then manipulate the corresponding input devices accordingly in order to avoid the obstacle. Such manipulation may result in shutting down the vehicle, or generally a change in the mode of operation of the vehicle in response in part to the safety signal, thus preventing an accident.

As another example, the tilling apparatus in a tractor may need to be stopped because the tractor has reached the end of the plot of land that needs to be tilled. In this situation, it may become necessary for the tractor to remain running or in motion but for the tilling apparatus to stop or shut down. Here, the safety signal may be generated through operator intervention, such as disengaging the input device of the tilling apparatus from its associated actuator or, in some embodiments, via a sensor indicating the end of tillable land. In the first scenario, operator intervention causes the transmission of the safety signal, in some embodiments, by breaking the current loop in the second communication link, and, in accordance with the corresponding control policy, the tractor will continue to run while the actuator corresponding to the tiller input device is disengaged or shut off. In the second scenario, the sensor data is processed by the controller and transmitted in accordance with the corresponding control policy, in some embodiments, by the first communication link over a network to the actuator corresponding to the tiller input device such that the tiller is disengaged or shut off while the remaining actuators continue to engage their respective input devices. In some embodiments, a result is a change in the vehicle mode of operation in response to the processing of the safety signal.

There are other embodiments in which the safety signal is transmitted in response to operator intervention. For example, on the detection of an emergency or safety signal, which may occur when an operator interrupts autonomous operation by depressing the brake, the current loop (an embodiment of the second communication link) is broken, causing an open circuit, and acting as a transmission of the safety signal to the corresponding actuators by the second communication link. The input device will then be manipulated accordingly based at least in part on the safety signal and the control policy corresponding to that particular input device. The safety signal and corresponding control policy causes the vehicle to operate in manual mode, or autonomous mode, or any combination thereof. Furthermore, in the same example, the safety signal could also be a stop signal, non-stop signal, or any combination thereof, to control the vehicle mode of operation. The vehicle will detect this occurrence and produce an autonomous mode signal, or in the alternative, enter a controlled shutdown mode, thus responding to and processing the safety signal.

In yet other embodiments, the safety signal is transmitted via both the first communication link and the second communication link, thus creating a redundant method for processing the safety signal. Generally, this ensures that the safety signal will be processed properly in the event one of the two communication links becomes inoperative. For example, as previously discussed, if an operator becomes aware of an obstacle and depresses the brake, the resulting safety signal will be transmitted serially via the second communication link to all associated actuators. Additionally, a sensor may detect the same obstacle and send, via the controller and in accordance with the proper control policy, the safety signal to the appropriate actuators via the first communication link to avoid the obstacle. Thus, in the event that one communication link fails, the other communication link will still process a safety signal.

Figure 4:
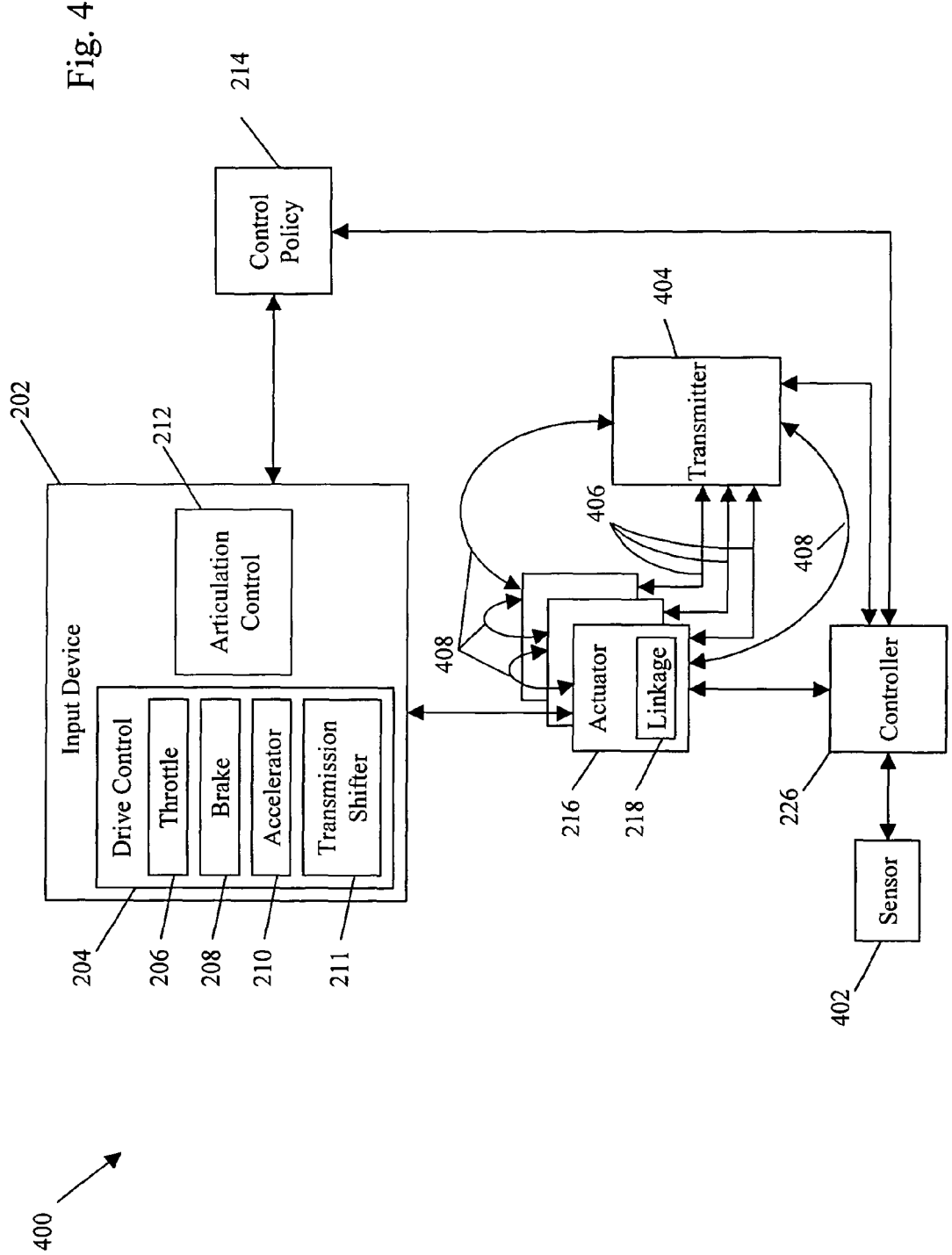
FIG. 4 is a block diagram depicting a system for processing a safety signal in an autonomous vehicle in accordance with an embodiment of the invention.

FIG. 4 is a block diagram that depicts a system 400 for processing a safety signal in an autonomous vehicle in accordance with an embodiment of the invention. The system 400 typically includes one or more input devices 202. An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device) For example, the input device can be a drive control 204. A drive control generally includes a throttle 206, brake 208, accelerator 210, or transmission shifter 211, or any combination thereof. A typical input device 202 is a throttle body (not depicted), which is typically connected to the throttle 206. Other example input devices 202 include a steering gear (not depicted) and tie rods (not depicted). In other embodiments, the input device can include an articulation control 212.

The system 400 also includes one or more control policies 214 corresponding to the input device 202. Generally, the control policy 214 determines the manner in which the vehicle will operate, typically allowing for vehicle control under autonomous or manual conditions, or a combination thereof. The system 400 also includes one or more actuators 216 associated with the one or more input devices 202. Typically, the actuator 216 includes an electromechanical device that drives the input device 202. In one embodiment of the invention, the actuator 216 includes one or more linkages or other mechanical transmissions 218. Generally, the linkage provides the association (e.g., physical connection) between an actuator 216 and the associated input device 202. A typical linkage is a lever and pivot joint, a typical transmission is a rack and pinion device. In one embodiment of the invention, the linkage 218 manipulates an input device 202 in response to the safety signal in accordance with the corresponding control policy 214.

The system 400 also includes one or more controllers 226 that, in some embodiments, are in communication with the actuators 216, the control policy 214, and one or more sensors 402. Generally, the sensor 402 includes any device that is capable of assessing the environment in and around the vehicle for the presence or absence of hazards or obstacles, as well as the position, or orientation, or both, of the vehicle. For example, in some embodiments a sensor is a localization sensor, such as a pitch sensor, roll sensor, yaw sensor, inertial navigation system, a compass, a global positioning system, or an odometer. In other embodiments, a sensor is a perception sensor, such as a LIDAR system, stereo vision system, infrared vision system, radar system, or sonar system. In some embodiments, the controller 226 transmits the safety signal based at least in part on the control policies 214. In some embodiments, the controller 226 is a microprocessor. In other embodiments, the controller 226 is a microcontroller.

A feature of the system 400 is that it includes a first communication link 406 between the controller 226 and each of the actuators 216. In one embodiment of the invention, the first communication link 406 includes a network connection. Another feature of the system 400 is that it includes a second communication link 408 between each of the plurality of actuators 218. In one embodiment of the invention, the second communication link 408 includes at least one current loop. In another embodiment of the invention, the second communication link 408 conveys a manual mode signal, an autonomous mode signal, or any combination thereof. In an alternate embodiment of the invention, the second communication link 408 conveys a stop signal, a non-stop signal, or any combination thereof.

The system 400 also includes a transmitter 404 which, in some embodiments of the invention, transmits the safety signal to at least one of the actuators 216 via the first communication link 406, the second communication link 408, or any combination thereof. Generally, the transmitter 404 can transmit data, such as the safety signal for example, in any manner in which data is transmitted to the actuators 216. For example, the transmission may be electrical, mechanical, wired, wireless, or any combination thereof. In some embodiments, the safety signal is transmitted in response to operator intervention. In other embodiments, the safety signal is transmitted in response to the output of at least one of the sensors 402.

Figure 5:
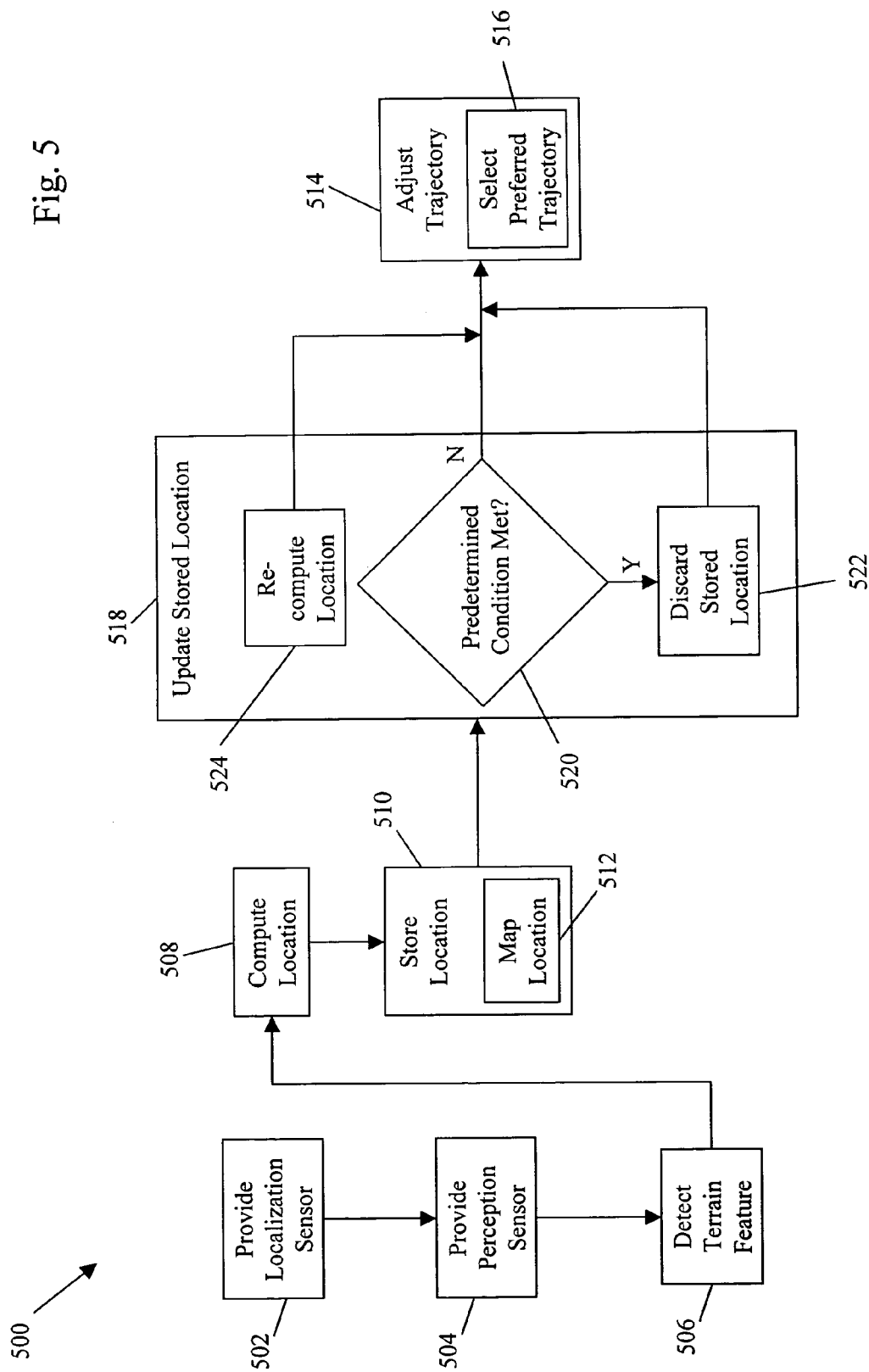
FIG. 5 is a flowchart depicting a method for tracking a terrain feature by an autonomous vehicle in accordance with an embodiment of the invention.

In brief overview, FIG. 5 is a flowchart depicting a method 500 for tracking at least one terrain feature by an autonomous vehicle in accordance with an embodiment of the invention. The method includes a step of first providing one or more localization sensors (STEP 502). The fusion of multiple localization sensors typically determines the position of the vehicle relative to one or more reference points. For example, in some embodiments, the localization sensor suite includes a pitch sensor, roll sensor, yaw sensor, compass, global positioning system, inertial navigation system, odometer, or any combination thereof. By fusing the weighed values of all of these sensors together, a more accurate representation of the vehicle's position and orientation can be achieved. For example, in some embodiments, data from the global positioning system, odometer, and compass may be fused together to accurately determine the position of the vehicle.

Next, the method 500 includes the step of providing one or more perception sensors (STEP 504). The perception sensor typically assesses the environment about the vehicle. For example, in some embodiments, the perception sensor suite includes a LIDAR system, stereo vision, infrared vision, radar, sonar, or any combination thereof. The ranging and feature data from the suite are fused together in a weighted fashion to build a more accurate representation of the space around the vehicle than can be achieved by using any single sensor alone. Next, embodiments according to the invention detect one or more terrain features about the vehicle (STEP 506). Detection is based at least in part on a change in the output of the perception sensor. Generally, the perception sensor will indicate the presence of a terrain feature that is a potential danger or hazard to the vehicle and that the vehicle may need to avoid. For example, the output of the perception sensor may indicate the presence of one or more of a fence, rock, ditch, animal, person, steep incline or decline, or any combination thereof. For example, in some embodiments, this feature may be a dismounted infantry soldier that the vehicle may need to track to perform a simple autonomous mission like following.

Next, the location of the terrain feature relative to the position of the vehicle is computed (STEP 508). The computation is based at least in part on the output of the localization sensor. For example, the output of the localization sensor is interpreted to place the vehicle at a point of a coordinate system. The output of the perception sensor is interpreted to place the terrain feature at particular coordinates relative to this point. Computations based on, for example, analytic geometry determine the displacement (i.e., distance and direction) between the terrain feature and the vehicle. For example, for a tractor tilling a field, the localization sensor of a tractor indicates the tractor is at point "A." The perception sensor then indicates the presence of a terrain feature, such as a fence. The location of the fence is then computed relative to point A. For example, the fence may be computed as being 100 feet directly in front of the vehicle location at point A. Of course, as the vehicle moves, point "A" moves as well. As the vehicle moves to a boundary of the coordinate system, the latter may be expanded or redefined to encompass additional area where the vehicle may traverse. In other words, the vehicle will not "fall off the map." Alternatively, in some embodiments, the origin of the coordinate system may be defined as the instantaneous location of the vehicle, meaning that the coordinate system can represent a roving sub-region of the universe about the vehicle. In this configuration, with the vehicle in motion, terrain features can enter and leave the coordinate system as they encounter the boundaries of the latter.

Next, the location(s) of the terrain feature(s) is (are) stored in at least one memory (STEP 510). In some embodiments, a precise determination of a terrain feature's location is required so, for example, the location data includes information to identify the terrain feature's location in three dimensions. Nevertheless, this may require a large amount of memory so, in some embodiments (e.g., where less precision is adequate), three-dimensional location data are mapped to two dimensions and stored accordingly (STEP 512). This generally reduces the amount of memory needed. In certain embodiments, terrain feature data is stored as points within a two dimensional plane. For example, in some embodiments, the system observes the location of the point in three dimensional space. If the point is higher than the top of the vehicle plus a danger buffer zone, then the point is discarded. If the point is within the plane of the ground surface, then the point is discarded. If the point is below the plane of the ground surface, it is retained as a "negative obstacle," i.e., a lack of surface across which to run. If the point is within the z-altitude that the body of the vehicle could pass through, it is stored as a "positive obstacle." Locations with the two-dimensional space that do not have stored points are presumed to be passable. In addition, terrain features may be stored as a point cloud set, whereby discarding three-dimensional points outside the volume of interest significantly reduces the size of the set. In the alternative, terrain feature data may be stored as bits within a two-dimensional occupancy grid, where the two-dimensional grid is smaller than a three-dimensional grid by the represented altitude divided by the vertical granularity. For example, in one embodiment, a boulder or other object or terrain feature may be detected at a location given by Cartesian coordinates $(x_1, y_1, z_1)$ relative to the location of the vehicle (defined as $x_0, y_0, z_0$). By storing only the x- and y-coordinates and not involving the z-coordinates in computations, memory is conserved and mathematical processing requirements are reduced. (In this example, the x- and y-coordinates represent the surface on which the vehicle travels, and the z-coordinate represents the elevation relative to this surface. Note that coordinate systems other than Cartesian (e.g., polar or spherical) may be used.)

Typically, the vehicle is in motion and the terrain feature is stationary. The scope of the invention also includes the case where the vehicle is stationary and the terrain feature is in motion, or the case where both the vehicle and terrain feature are in motion. In any case, an embodiment of the invention includes the step of updating the stored location of the terrain feature as its location changes relative to the vehicle (STEP 518). Consequently, the vehicle maintains an accurate and dynamic representation of the surrounding terrain and terrain feature.

In some embodiments, updating the stored location (STEP 518) includes recomputing the location of the terrain feature based on changes in the outputs of the localization sensors, perception sensors, or both (STEP 524). Generally, once one of the sensors indicates a change from a previous output, the location is recomputed (STEP 524) and stored in memory, and thus the stored location is updated. In some embodiments, updating the stored location of the terrain feature (STEP 518) is based only on a change in the output of the localization sensor, indicating a change in the location of the vehicle. For example, the perception sensor may detect a stationary boulder while the vehicle is moving. The movements of the vehicle cause changes in the output of the localization sensor (i.e., the changing output represents the changing location of the vehicle). The outputs of the localization and perception sensors are used to compute a displacement to the terrain feature. Because this displacement is relative to the location of the vehicle, and because the vehicle is moving, updated displacement values are computed during the movement.

In other embodiments, updating the stored location of the terrain feature (STEP 518) is based only on a change in the output of the perception sensor, indicating a change in the environment about the vehicle, for example the initial detection of a terrain feature or movement of a terrain feature. When the vehicle is stationary and the terrain feature is moving, changes in the output of the perception sensor give rise to changing displacement values.

In some embodiments, after recomputing the location of the terrain feature (STEP 524), the previously stored location is discarded from memory (STEP 522), typically to conserve space. In one embodiment, the discard occurs after a predetermined condition is met (STEP 520). A typical predetermined condition permits the discard when the displacement between the vehicle and the terrain feature exceeds a particular value, generally because the terrain feature is too distant to represent a hazard to the vehicle. For example, if a boulder is detected ten meters from the vehicle, but the vehicle is moving (as detected by the localization sensor) away from the boulder, the computed displacement to the boulder will increase. When, for example, the distance portion of the displacement exceeds fifteen meters, the location of the terrain feature is discarded.

In another embodiment, the perception sensor is characterized by a persistence. Generally, a persistence means that the perception sensor must assess the surrounding environment for a period of time before indicating the state of the surrounding environment. In other words, a single detection, based on, for example, on one sweep of the surrounding environment by the perception sensors may, in some embodiments, be insufficient for the perception sensor to indicate the presence of a terrain feature. Accordingly, in some embodiments, accurate detection of a terrain feature requires multiple sweeps by the perception sensor, and detection of that terrain feature on each sweep. Persistence addresses instances where a terrain feature is intermittent and, therefore, unlikely to represent a hazard. For example, if a bird were to fly quickly in front of the perception sensor, then continue flying away and out of range of the perception sensor, the presence of the bird would not be sensed as a terrain feature because the condition of the persistence was not met, as the bird was detected in too few perception sensor sweeps of the environment about the vehicle.

If the perception sensor suite detects a terrain feature, the location of the terrain feature is stored in memory as discussed above. If one or more subsequent perception sensor sweeps fail to detect the terrain feature, then, in some embodiments, a condition is met that causes the location of the terrain feature to be discarded. In other words, if a terrain feature does not "persist" in the field of view the perception sensors suite for a sufficient amount of time, then the terrain feature is deemed not to represent a hazard, and its location is discarded.

After the location of a terrain feature is determined, one embodiment includes the step of adjusting the trajectory of the vehicle based at least in part on the terrain feature location stored in the memory (STEP 514). This is generally done to so the vehicle avoids the terrain features that are obstacles and any attendant hazards. Adjustment in the trajectory may be any change in the movement of the vehicle. In some embodiments, the step of adjusting the trajectory (STEP 514) includes the step of selecting the preferred trajectory from a plurality of ranked alternative trajectories (STEP 516). Generally, the plurality of alternative trajectories may be possible responses to a terrain feature, and they typically are ranked in a certain order that indicates preference. For example, the most preferred alternative trajectory may be that trajectory that requires the smallest adjustment to avoid a collision. Conversely, the least preferred alternative trajectory may require the largest adjustment.

As an illustrative example, consider the case where a terrain feature is minor in nature, such as a small shrub that is computed to be seventy-five meters in front and two degrees to the left of the vehicle. The selected preferred response may be to adjust the vehicle trajectory by moving one degree to the right causing the vehicle to continue close to the terrain feature while avoiding a collision. Conversely, if the terrain feature is major, such as a cliff located thirty meters directly in front of the vehicle for example, the preferred trajectory may be a 180 degree change in vehicle direction.

Figure 6:
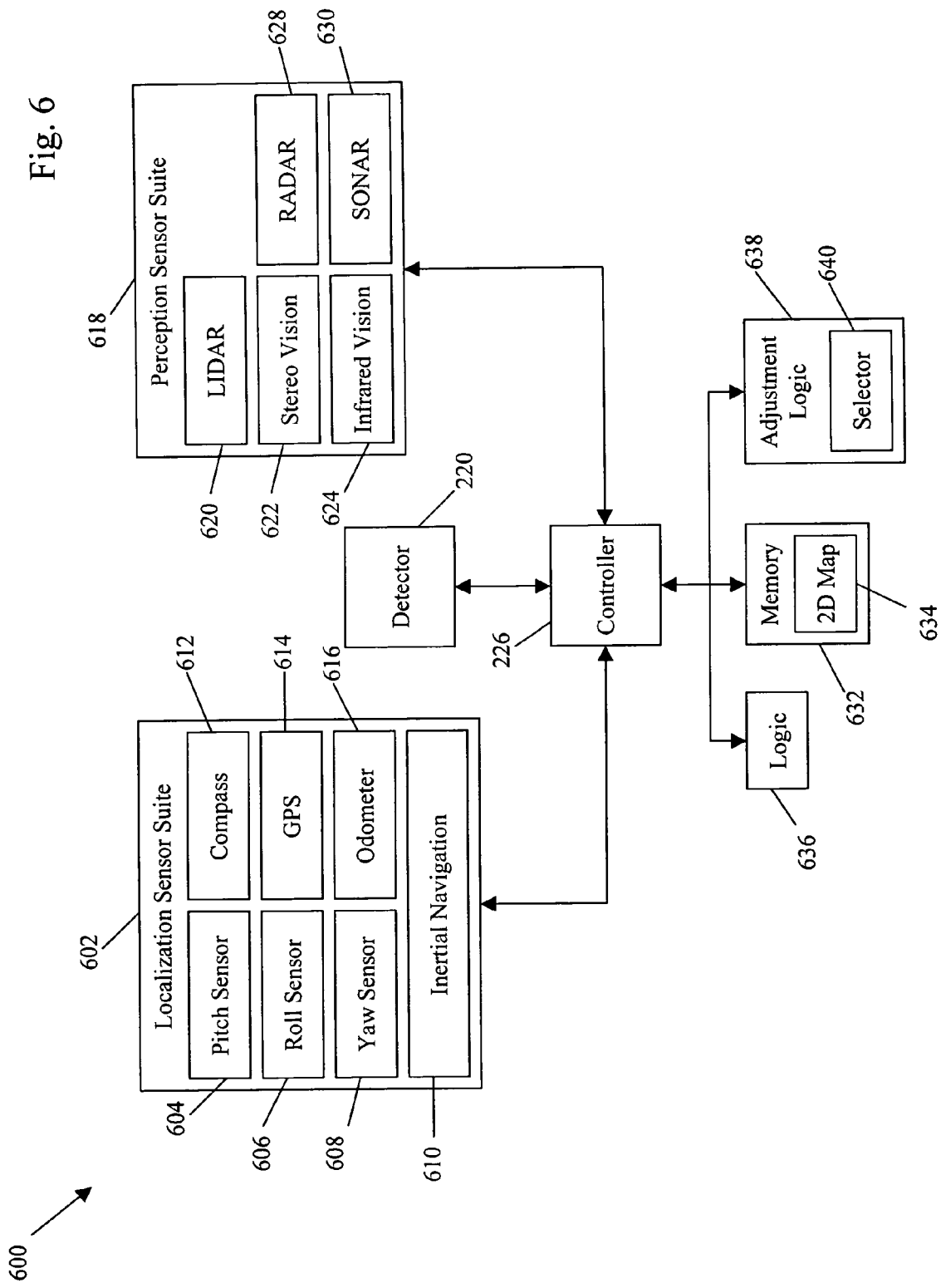
FIG. 6 is a block diagram depicting a system for tracking a terrain feature by an autonomous vehicle in accordance with an embodiment of the invention.

FIG. 6 is a block diagram depicting a system 600 for tracking a terrain feature by an autonomous vehicle in accordance with an embodiment of the invention. The system 600 includes a localization sensor suite 602. The localization sensor suite may include a pitch sensor 604, a roll sensor 606, a yaw sensor 608, an inertial navigation system 610, a compass 612, a global positioning system 614, an odometer 616, or any combination thereof. The localization sensor suite 602 generally includes any device or sensor capable at least in part of determining the position or orientation of the autonomous vehicle. The localization sensor suite 602 fuses the data from each sensor in the suite together in a weighted fashion to achieve a more robust estimations of state than is available with any individual sensor by itself. In some embodiments, the localization sensor suite 602 determines the orientation of the vehicle, such as its pitch, roll, or yaw in part to ensure that the vehicle is not in danger of tipping over on its side, for example. In other embodiments, the localization sensor suite 602 determines the position of the vehicle in addition to its orientation, such as the location of the vehicle on a plot of land, for example.

The system also includes a perception sensor suite 618. The perception sensor suite assesses the environment about the vehicle and generally includes a LIDAR system 620, stereo vision system 622, infrared vision system 624, a radar system 628 a sonar system 630, or any combination thereof. The system 600 also includes a detector 220 that detects the presence of all navigationally significant terrain features in response to a change in the output of the perception sensor suite 618. Generally, the detector 220 is typically apparatus or software that correlates the output of the perception sensor suite 618 to the presence or absence of a terrain feature.

In an alternative embodiment, the perception sensor suite 618 is characterized at least in part by a persistence. Generally, a persistence ensures against a false-positive reading of a potential terrain feature by creating a condition that the terrain feature must remain the perception sensor suite 618 field of view for a particular time, typically for a number of perception sensor sweeps. For example, if a tractor is tilling a plot of land, in addition to permanent terrain features such as, for example, trees, rocks, or fences, the perception sensor suite 618 combined with the detector 220 will also detect objects that briefly enter the environment about the vehicle including, for example, a bird that flies across the field at a relatively low altitude, a ball that is thrown through the environment about the vehicle, debris carried by the wind through this same environment, or other transitory objects. In one embodiment, if a terrain feature does not "persist" in the perception sensor suite 618 field of view for a particular time, then the terrain feature does not represent a hazard to the vehicle. Typically, the persistence may be defined to increase or decrease the likelihood that transitory objects, such as the examples given above, are characterized and assessed as terrain features.

The system 600 also includes a controller 226 capable of computing the location of at least one terrain feature relative to the position of the vehicle and based at least in part on the output of the localization sensor suite 602. In some embodiments, the controller 226 includes a microprocessor. In other embodiments, the controller 226 includes a microcontroller. Generally, once the detector 220 has detected a terrain feature based at least in part on a change in perception sensor suite 618 output, the controller 226, in communication with the detector 220, computes the distance to the terrain feature relative to the vehicle based on the output of the localization sensor suite 602. For example, the presence of a fence on a plot of land causes a change in perception sensor suite 618 output, such that detector 220 detects the fence as a terrain feature. The localization sensor suite 602 output indicates that the vehicle is currently at a specific point on the same plot of land. The controller 226 then calculates the displacement between the vehicle and the fence.

The system 600 also includes a memory 632 for storing the location of one or more terrain features. The memory can be volatile (e.g., SRAM, DRAM) or nonvolatile (e.g., ROM, FLASH, magnetic (disk), optical (disk)). In an alternative embodiment, the stored location of a terrain feature in memory 632 includes a mapped two-dimensional representation of a three dimensional representation 634. Generally, in some embodiments, the mapped two-dimensional representation includes any two coordinate points that identify the distance of a terrain feature relative to the vehicle. The two-dimensional representation typically provides less precision, but requires less memory and computational power to maintain or update. The reduced precision compared to a three-dimensional representation may be adequate in certain applications.

In some embodiments, the stored location of a terrain feature is based on a change in the output of the localization sensor suite 602. Generally, if a terrain feature is stationary but the vehicle is in motion, the localization sensor suite 602 output changes to reflect the motion of the vehicle. The controller 226 then determines the displacement between the terrain feature and the new vehicle location, and this new displacement is stored in memory 632. Therefore, in this embodiment, the stored location is based on a change in localization sensor suite 602 output.

In other embodiments, the stored location of a terrain feature is based on a change in the output of the perception sensor suite 618. For example, if a terrain feature such as a cow begins moving towards the operating vehicle (e.g., a tractor), the perception sensor suite 618 output will indicate this change in the environment about the vehicle. The detector 220 will detect this change in output and the controller 226 will compute the location of the terrain feature relative to the vehicle. This new displacement will then be stored in memory 632 based on the change in perception sensor suite 618 output caused, in this example, by the movement of the cow.

In an alternative embodiment, the system 600 also includes logic 636 for discarding the stored location based at least in part on satisfying at least one predetermined condition. Generally, the predetermined condition may include any user-defined terms, events, or any combination thereof that must occur or be in existence before discarding the terrain feature's location from memory 632. In yet another embodiment, the predetermined condition includes exceeding a predetermined displacement between the location of the terrain feature and the location of the vehicle. For example, in one possible embodiment, the system 600 is set with a predetermined displacement value of fifteen meters rearward of the vehicle, a terrain feature is detected ten meters directly south of the vehicle, and the vehicle is moving north. The location of this terrain feature is stored in memory because it is within (i.e., closer to the vehicle than) the fifteen meter rearward predetermined displacement. Continuing with the example, as time progresses, the vehicle moves such that the terrain feature is over fifteen meters behind the vehicle. At this point, the location of the terrain feature will, in this embodiment, be deleted from memory 632 and not be stored in memory 632 unless the object once again comes within the predetermined displacement value.

In yet another embodiment, the logic 636 discards the stored location when the predetermined condition includes failing to detect continuously the terrain feature for a sufficient amount of time (e.g., the terrain feature does not "persist" in the field of view the perception sensors for a sufficient number of sweeps). For example, the predetermined condition may be that the perception sensor suite 618 indicates that a terrain feature is greater than a certain distance, for example fifty meters, from the vehicle, and the persistence generally ensures that the perception sensor suite 618 repeatedly over a period of time sweeps through the environment about the vehicle, senses the presence of the terrain feature. In such a case, a single indication that the terrain feature that was once forty-nine meters from the vehicle is now more than fifty meters from the vehicle may be insufficient to cause the stored location to be discarded from memory 632 because the persistence has not been satisfied. However, multiple indications over a period of time, or multiple sweeps by the perception sensor suite 618 that all indicate that the terrain feature may satisfy the predetermined condition, (i.e., is greater than fifty meters from the vehicle) and may also satisfy the persistence, therefore in this case the terrain feature location will be discarded from memory 632.

In another embodiment, the system 600 includes adjustment logic 638 for adjusting the trajectory of the vehicle based at least in part on the location of one or more terrain features stored in memory 632. Generally, adjustment logic 638 may alter the direction or trajectory of the vehicle and may include any change in the vehicle direction, mode of operation, or any combination thereof. For example, if a terrain feature is stored in memory 632 as being twenty meters in front of the vehicle, the adjustment logic 638 may adjust the vehicle trajectory to the left by five degrees, resulting in the avoidance of a collision between the terrain feature and the vehicle. In some embodiments, the adjustment logic 638 includes a selector 640 for selecting one preferred trajectory from a plurality of ranked alternative trajectories. To continue with the immediately preceding example, in response to a terrain feature twenty meters in front of the vehicle, the selector may for example have the options of entering a controlled shutdown, turning left five degrees, left ten degrees, right five degrees, right ten degrees, or turning around 180 degrees. In one embodiment, the alternative trajectory of turning the vehicle to the left five degrees may be the most desirable and thus highest ranked of all alternative trajectories. Therefore, the selector 640 selects this option to be executed by the vehicle.

Figure 7:
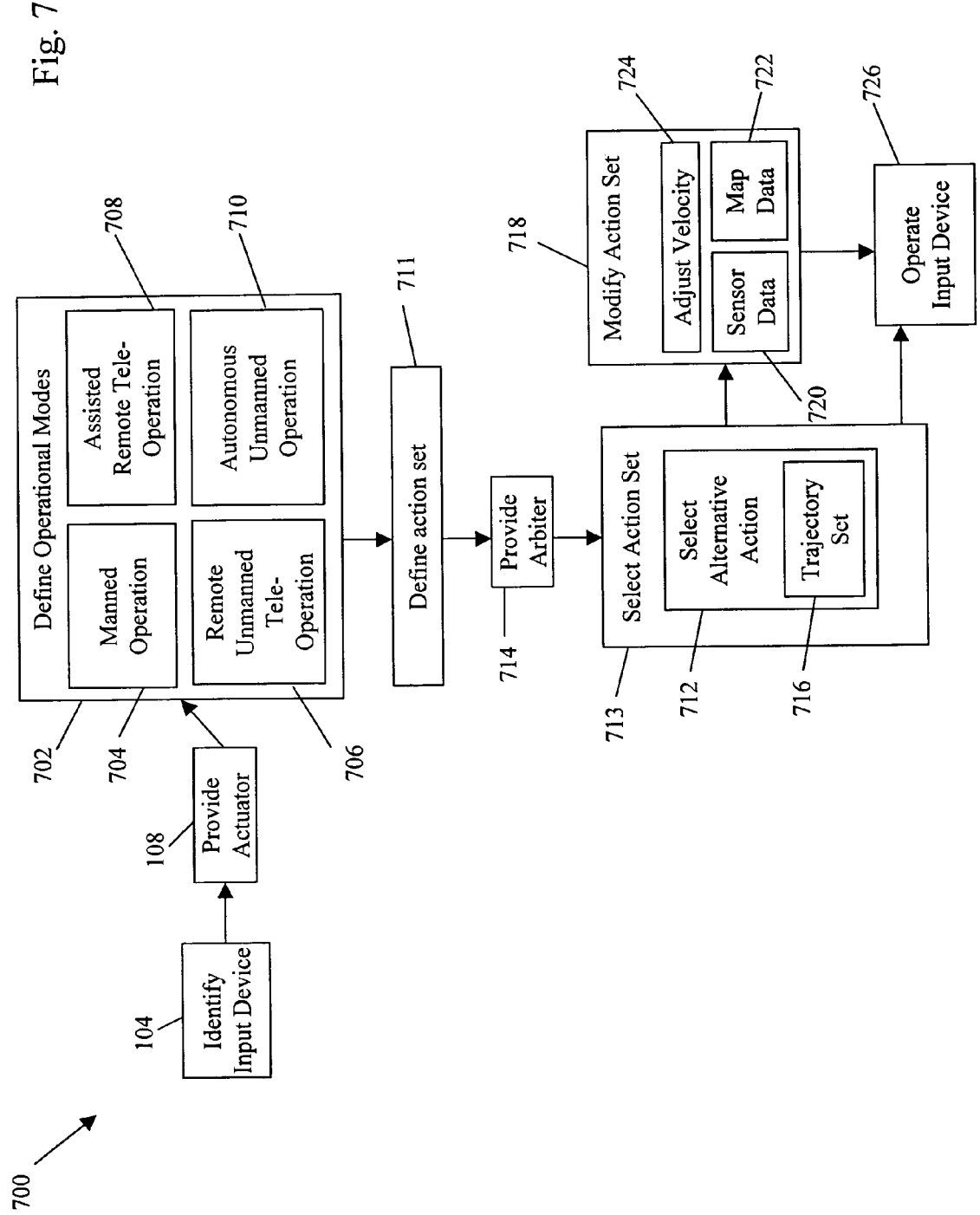
FIG. 7 is a flowchart depicting a method for the behavior based control of an autonomous vehicle in accordance with an embodiment of the invention.

In brief overview, FIG. 7 is a flowchart depicting a method 700 for behavior based control of a vehicle in accordance with an embodiment of the invention. The method includes the step of first identifying one or more input devices in the vehicle (STEP 104). An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the input device can be a drive control. A drive control generally includes a throttle, brake, accelerator, or any combination thereof. A typical input device is a throttle body, which is typically connected to the throttle 206. Other example input devices include a steering gear and tie rods. In other embodiments, the input device can be an articulation control. An articulation control generally operates equipment attached to the vehicle. This can include, for example, a control used to manipulate a blade on a bulldozer, or a tilling apparatus on a tractor.

Next, the method 700 includes the step of providing one or more actuators (STEP 108) associated with one or more input devices. The actuator is typically an electro-mechanical device that manipulates the input devices. Manipulation occurs by, for example, pushing, pulling, or turning the input devices, or by any combination thereof. A result of this is the autonomous control of the vehicle. Generally, the presence of actuators in the vehicle does not preclude manual operation of the corresponding input devices.

In addition to the step of identifying the input devices (STEP 104), and providing the actuators (STEP 108) the invention also includes the step of defining a plurality of operational modes (STEP 702) associated with the actuators. Each mode allows the vehicle to be operated in a separate and distinct fashion. Each mode may also include a plurality of behaviors. Each behavior typically is a separate program that proposes an action set to the vehicle's behavior arbiter. In some embodiments, the step of defining a plurality of operational modes (STEP 702) includes defining a manned operation mode (STEP 704), a remote unmanned tele-operation mode (STEP 706), an assisted remote tele-operation mode (STEP 708), an autonomous unmanned operation mode (STEP 710), or any combination thereof. Autonomous unmanned operation mode (STEP 710) is the state where the vehicle is performing a prescribed task with little or no operator intervention. The vehicle modifies its actions to compensate for terrain features that may be obstacles and other hazards. In contrast, the manned operation mode (STEP 704) overrides autonomous control of the vehicle and allows an operator to control the vehicle. The two tele-operational modes (STEP 706 and STEP 708) are the states where the unmanned vehicle is being operated from a remote location by a dismounted operator or by an operator in a chase vehicle.

Next, some embodiments of the invention include the step of defining at least one action set (STEP 711). An action set is typically characterized at least in part by a priority and each action set generally includes a plurality of alternative actions that are ranked according to a corresponding plurality of preferences.

Next, in an embodiment of the invention, an arbiter or arbiters that are associated with the actuator are provided (STEP 714). An arbiter selects the action set having the highest corresponding priority (STEP 713). The arbiter also selects the alternative action from the selected action set having the highest preference (STEP 712). In some embodiments, the selection of the alternative action (STEP 712) includes the selection of a trajectory set (STEP 716). A trajectory set is typically a series of alternative navigation commands that prescribe the vehicle direction and rate of travel (i.e., translational and rotational velocity). For example, to avoid a terrain feature or other hazard, the vehicle may change its speed, direction, or both, in varying degrees. To accomplish this, the vehicle may slow slightly and turn slightly, or it may turn abruptly and slow dramatically (e.g., to maintain vehicle stability). Clearly, many combinations of speed and direction are possible. Generally, each such combination is a member of the trajectory set.

Next, in some embodiments, the arbiter modifies the selected action set (STEP 718), typically by modifying one or more of the alternative actions contained in the selected action set. Modification generally entails tailoring the chosen action to the particular situation such that the vehicle then executes the modified chosen action. For example, for the selected trajectory set, the arbiter can reduce the vehicle velocity along the arc of travel. To illustrate, consider the case where a tractor is tilling a field under autonomous operation. Assume that an obstacle, such as a tree, is detected in the path of the tractor, but still at a safe distance ahead of the tractor. At this point, there are several potential behaviors available to the vehicle. Some of the possibilities include for the tractor to remain in autonomous operation, or switch to manual operation or safety operation. Staying with this representative example, it is typically within the ability of the tractor to avoid a static object, such as a tree, while in autonomous control. In this example, the arbiter examines the available alternative action sets (i.e., alternative trajectory sets that will keep the tractor from encountering the tree). The arbiter then selects the highest priority action set (e.g., the trajectory set requiring the least amount of change relative to the intended path of the vehicle).

In some embodiments, the arbiter modifies the selected action set (STEP 718), typically in response to other data. The data may include information received from sensors (STEP 720), such as the localization sensor suite 602, or the perception sensor suite 618, or both. In some embodiments, the data may include a constraint on actions. This constraint may include a command that the selected trajectory set not allow vehicle movement in a certain direction, or at a certain speed. In some embodiments, the selected action set may include a restriction set for implementing the constraint on the action set. Generally, the constraint defines an impermissible area of vehicle operation. The data may also include information received from the vehicle's resident local terrain feature map (STEP 722). In other words, the selected trajectory set provides a baseline alternative trajectory for the vehicle, but arbiter can modify this baseline to compensate for variations in the environment around the vehicle. While the baseline trajectory may be adequate in some circumstances, the presence of, for example, other terrain features or hazards along the baseline trajectory is generally unacceptable. The arbiter integrates information received from sensors and map data to ensure that the vehicle can adhere to baseline trajectory without significant risk. If the vehicle were to encounter terrain features or hazards along the baseline trajectory, the arbiter modifies the latter as needed.

In some embodiments, after the alternative action with the highest preference has been selected, an embodiment of the invention operates the input device in accordance with the selected alternative action (STEP 726). In some embodiments, the action set may be modified (STEP 718) before operating the input device in accordance with the selected alternative action (STEP 726). Generally, once the arbiter has selected an alternative action (STEP 712) from the selected action set and modified (STEP 718) the selected action set, the input device is then operated in accordance with that action. For example, if the selected alternative action is a safety operation, such as a controlled shutdown of the tilling apparatus on a tractor, and the arbiter modifies this alternative action by allowing background operations, such as the localization sensors to continue running, the input device associated with the tilling apparatus will be commanded to shut down, but the localization sensors will continue to operate normally in a manner consistent with the selected alternative action.

Figure 8:
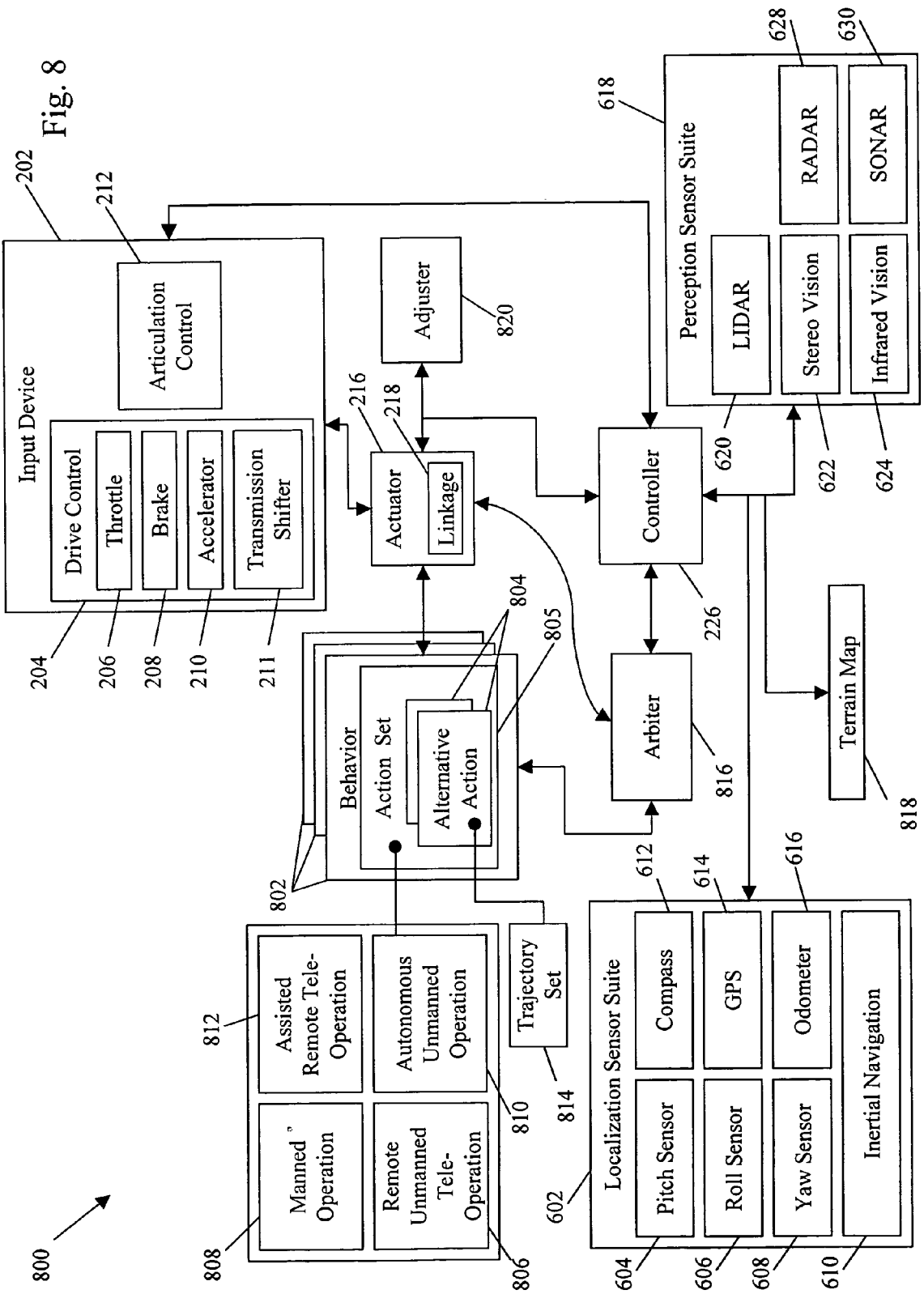
FIG. 8 is a block diagram depicting a system for the behavior based control of an autonomous vehicle in accordance with an embodiment of the invention.

FIG. 8 is a block diagram depicting a system 800 for behavior based control of a vehicle in accordance with an embodiment of the invention. As in the other Figures, the interconnections depicted in FIG. 8 represent various communication paths between the enumerated objects. The system 800 typically includes one or more input devices 202. An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the input device can be a drive control 204. A drive control generally includes a throttle 206, brake 208, accelerator 210, or transmission shifter 211, or any combination thereof. A typical input device 202 is a throttle body (not depicted), which is typically connected to the throttle 206. Other example input devices 202 include a steering gear (not depicted) and tie rods (not depicted). In other embodiments, the input device includes an articulation control 212.

The system 800 also includes one or more actuators 216 associated with the one or more input devices 202. Typically, the actuator 216 includes an electromechanical device that drives the input device 202. In one embodiment of the invention, the actuator 216 includes one or more linkages or other mechanical transmissions 218. Generally, a linkage provides the association, (e.g., physical connection) between an actuator 216 and the associated input device 202. A typical linkage is a lever and pivot joint, a typical transmission is a rack and pinion device.

The system 800 also includes a plurality of behaviors 802 associated with the actuator 216, where each behavior 802 includes at least one action set 805 ranked according to a corresponding plurality of priorities, and each action set 805 includes a plurality of alternative actions 804 ranked according to a corresponding plurality of preferences. The system 800 also includes at least one arbiter 816 associated with the actuator 216 for selecting the action set 805 having the highest corresponding priority and for selecting the alternative action 804 having the highest corresponding preference within the selected action set 805. In some embodiments the arbiter 816 modifies the selected alternative action 804. Generally, the arbiter is software, hardware, or a combination thereof.

The different modes of vehicle operation generally contain a plurality of behaviors. For example, in some embodiments, the modes include a remote unmanned tele-operation mode 806, a manned operation mode 808, an autonomous unmanned operation mode 810, assisted remote tele-operation mode 812, or any combination thereof. These modes each generally correspond to different vehicle missions. For example, the manned operation mode 808 may dictate that only the operator may control the vehicle, whereas autonomous unmanned operation mode 810 would generally be a behavior where the vehicle needs little or no operator intervention. The remote unmanned tele-operation mode 806 and assisted remote tele-operations mode 812 are the states where the unmanned vehicle is being operated from a remote location by a dismounted operator or by an operator in a chase vehicle. In some embodiments, the plurality of alternative actions 804 of an action set 805 include a trajectory set 814. Generally, the trajectory set 814 includes a plurality of possible trajectories, or paths, that the vehicle may follow. For example, a trajectory set 814 represents the possible paths of vehicle motion with each path being one degree clockwise from the previous trajectory path. In some embodiments, the vehicle modifies the selected action to avoid a terrain feature.

Additionally, in some embodiments, the system 800 may include at least one adjuster 820 for adjusting the translational velocity of the vehicle and a rotational velocity of the vehicle, or any combination thereof. Generally, the adjuster 820 will adjust the speed, or direction, or both, of the vehicle so it follows its designated trajectory or avoids an obstacle.

A plurality of priorities determines the ranking of the plurality of alternative actions. Generally, the most important actions for safe vehicle operation will be given the highest priority. For example, if there is a boulder 100 meters in front of the vehicle, and a group of people five yards in front of the vehicle, within an action set 805 there will be one alternative action 804 for avoiding the boulder, for example a slight adjustment in the vehicle rotational velocity, which would be an autonomous unmanned operation 810, appropriately modified. There may be another alternative action 804 for avoiding the group of people, for example a controlled emergency shutdown. Here, from within action set 805 the alternative action 804 with the highest corresponding preference would be given to the safety operation due to the more immediate nature of the threat. The priority can for example be determined from the distance to the terrain feature(s).

The maximum vehicle speed and correspondingly its maximum deceleration speed can be linked to the amount and density of navigationally significant terrain features in the local vicinity of the vehicle. The vehicle will limit its speed so it only requires a configurable fraction of the maximum deceleration rate of the vehicle to come to a complete stop while still safely avoiding all obstacles. The planned fraction of the deceleration rate is typically used to control the fraction of the vehicle's performance envelope used when avoiding obstacles. This provides a configuration for providing safety margins and for tuning the smoothness of the control of the vehicle.

The system 800 also includes one or more controllers 226 that, in some embodiments, are in communication with the input devices 202 and the arbiter 816 so the controller 226 operates the input devices 202 in accordance with the selected alternative action 804. In some embodiments the selected alternative action 804 may be modified. In some embodiments, the controller 226 is a microprocessor. In other embodiments, the controller 226 is a microcontroller. For example, if the alternative action 804 selected by the arbiter 816 calls for the vehicle to maintain autonomous operation while decreasing its speed by ten percent and turning left by forty-five degrees, the controller 226 will control the actuators 216 associated with the input devices 202, such as the drive control 204 to change the vehicle speed, and a steering wheel to change the vehicle direction.

In some embodiments of the invention, the system 800 also includes a localization sensor suite 602, a perception sensor suite 618, a local vehicle centric terrain map 818, or any combination thereof. Typically, the localization sensor suite 602 may include one or more of a pitch sensor 604, roll sensor 606 yaw sensor 608, inertial navigation system 610, compass 612, global positioning system 614, odometer 616, or any combination thereof. The localization sensor suite 602 is generally responsible for fusing the data from multiple sensors together in a weighted fashion to develop a superior estimate of the position of the vehicle. Typically, the perception sensor suite 618 may include one or more of a LIDAR system 620, stereo vision system 622, infrared vision system 624, radar system 628, sonar system 630, or any combination thereof. The perception sensor suite 618 typically assesses the environment about the vehicle and is generally responsible for fusing the data from multiple perception sensors together in a weighted fashion to develop a more accurate description of the navigationally significant terrain features in the local environment about the vehicle. The terrain map 818 generally is a compilation of all terrain features detected within the environment about the vehicle. For example, the terrain map 818 may indicate that there is a steep incline twenty meters directly to the left of the vehicle, and a tree 100 meters in front by twenty meters to the right of the vehicle.

Figure 9:
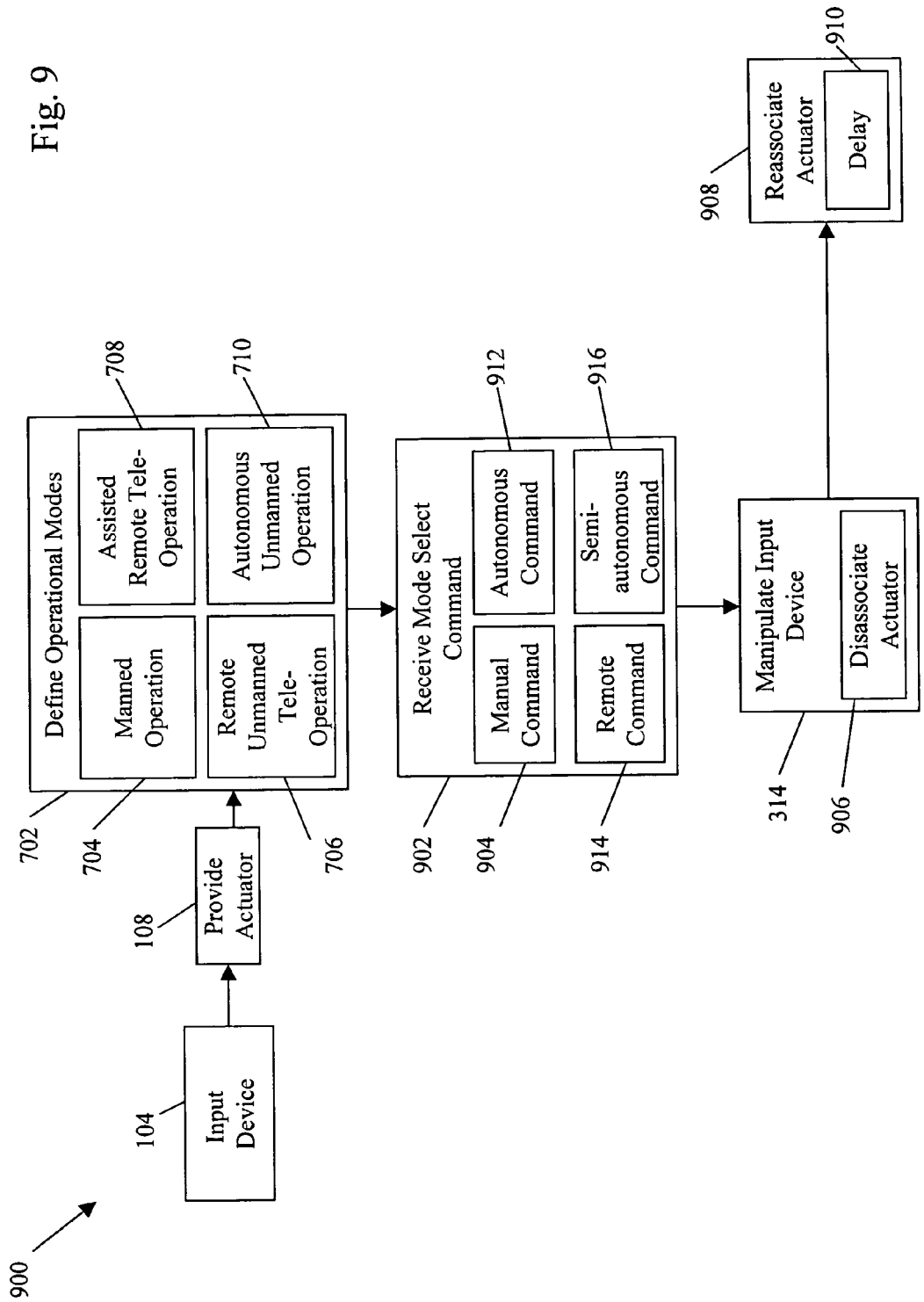
FIG. 9 is a flowchart depicting a method for multi-modal control of a vehicle in accordance with an embodiment of the invention.

In brief overview, FIG. 9 is a flowchart depicting a method 900 for selective control of a vehicle in accordance with an embodiment of the invention. The method includes a step of identifying one or more input devices in the vehicle (STEP 104). An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the input device can be a drive control. A drive control generally includes a throttle, brake, or accelerator, or any combination thereof. A typical input device is a throttle body, which is typically connected to the throttle. Other example input devices include a steering gear and tie rods. In other embodiments, the input device can be an articulation control. An articulation control generally operates equipment attached to the vehicle. This can include, for example, a control used to manipulate a blade on a bulldozer, or a tilling apparatus on a tractor.

In addition to the identification of the input devices (STEP 104), the invention also includes the step of providing one or more actuators (STEP 108) associated with one or more input devices. The actuator is typically an electromechanical device that manipulates the input device. Manipulation occurs by, for example, pushing, pulling, or turning the input device, or by any combination thereof. A result of this is the autonomous control of the vehicle. Furthermore, in an embodiment of the invention, the actuators still allow manual operation of the vehicle. In other words, the presence of actuators in the vehicle does not preclude manual operation of the corresponding input devices. In some embodiments, a linkage or other mechanical transmission associates the actuator with the corresponding control surface. A linkage is generally any apparatus that facilitates any connection between the input device and the actuator. A typical linkage is a lever and pivot joint, a typical transmission is a rack and pinion device.

Next, a plurality of operational modes associated with the actuator are defined (STEP 702). Generally, these operational modes may be defined to include manned operation (STEP 704), remote unmanned tele-operation (STEP 706), assisted remote tele-operation (STEP 708), autonomous unmanned operation (STEP 710), or any combination thereof.

Next, the vehicle receives at least one mode select command (STEP 902). Generally, the mode select commands dictate the operation of the vehicle. In some embodiments, this includes receiving an autonomous operation command (STEP 912). In this case, the actuator manipulates the input device (STEP 314) in accordance with (i) the task the vehicle is performing, and (ii) at least one of the associated behaviors.

In another embodiment, receiving the mode select command (STEP 902) includes receiving a remote command (STEP 914). Generally, this allows for remote-controlled operation of the vehicle, i.e., the case where an operator maintains control over the vehicle when not physically present in the vehicle. Here, vehicle control typically is not autonomous, but there is generally no disassociation between the actuators and the input devices because the association is usually necessary for remote vehicle operation.

In another embodiment, receiving the mode select command (STEP 902) includes receiving a manual operation command (STEP 904). In this case, the step of manipulating the input device (STEP 314) may include the step of disassociating the actuator from the input device (STEP 906). For example, after receiving of the manual operation command (STEP 904), the actuator typically decouples from the corresponding drive control. This allows an operator to work the drive control without resistance from the actuator. In other embodiments, after disassociating the actuator (STEP 906), the actuator is reassociated with the input device (STEP 908). For example, this may occur when a vehicle operating manually (i.e., with a disassociated actuator) reverts to autonomous control. In such a case, the actuator must reassociate with the input device to resume autonomous control of the input device. In an another embodiment, the step of reassociating the actuator (STEP 908) occurs after a predetermined delay (STEP 910). For example, such a delay can be implemented as a safety precaution to ensure that the vehicle does not revert prematurely or falsely to autonomous control.

In yet another embodiment, receiving the mode select command (STEP 902) includes receiving a semi-autonomous command (STEP 916). In this case, the step of manipulating the input device (STEP 314) includes operating the input device in accordance with (i) one or more of the plurality of behaviors, and (ii) at least one remote transmission. Generally, the semi-autonomous command (STEP 916) allows autonomous operation of certain features of the vehicle in combination with operator control of other features. The operator is typically, although not necessarily, located away from the vehicle. For example, a tractor may follow a path or pattern prescribed and controlled by an operator. During traversal of the path or pattern, the tractor may encounter one or more terrain features that are obstacles. It is likely that the operator would not see these terrain features if the operator is not present in the vehicle. Consequently, it is advantageous that the vehicle compensate for the presence of the terrain features without requiring operator intervention. The vehicle accomplishes this by relying on an obstacle avoidance behavior that runs in concert with the semi-autonomous command mode. The vehicle may, for example, autonomously alter its trajectory, or speed, or both to avoid the terrain features.

Figure 10:
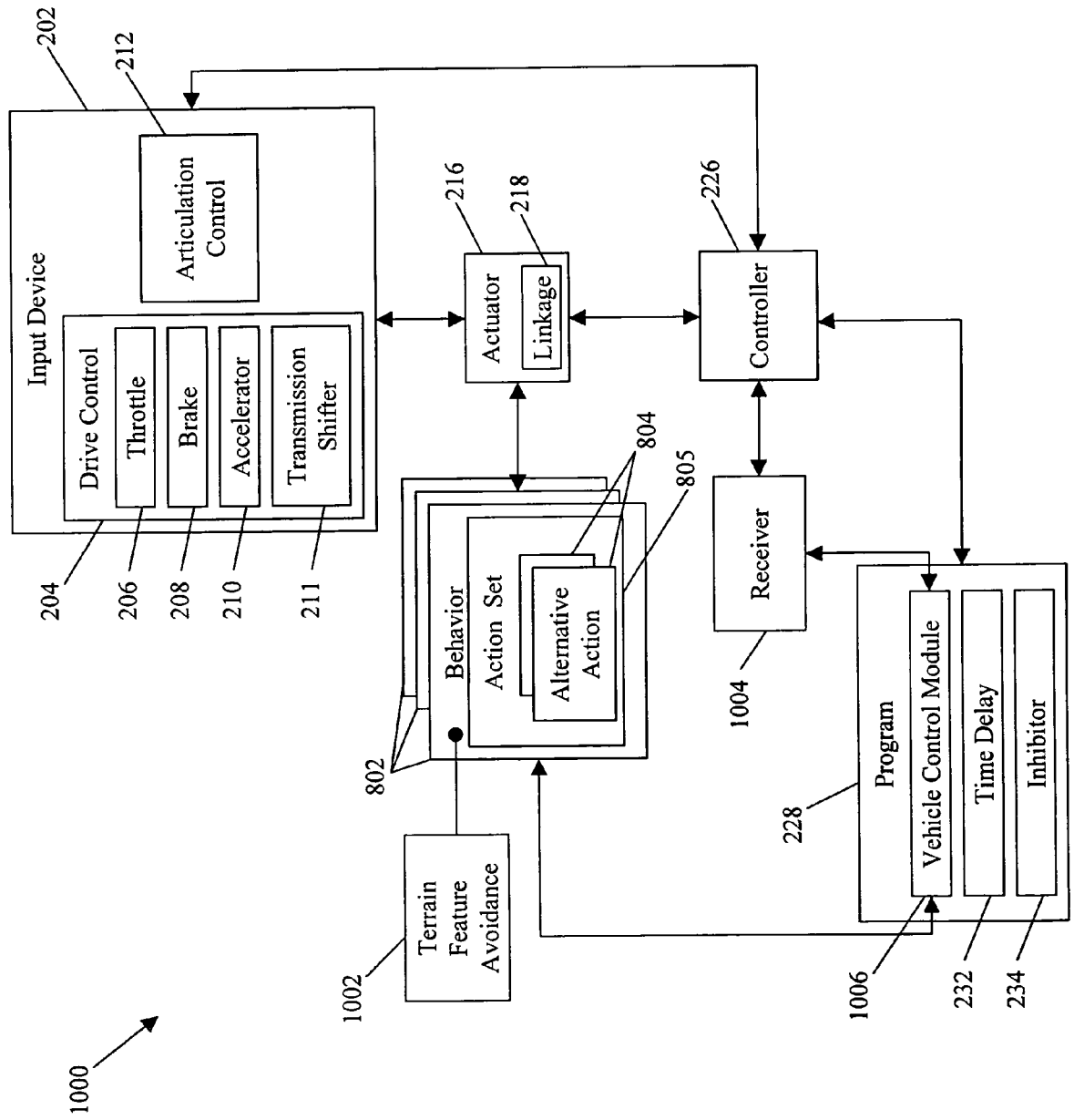
FIG. 10 is a block diagram depicting a system for multi-modal control of a vehicle in accordance with an embodiment of the invention.

FIG. 10 is a block diagram that depicts a system 1000 for selective control of a vehicle in accordance with an embodiment of the invention. The system 1000 typically includes one or more input devices 202. An input device may be an operator input device that directs at least part of the vehicle (e.g., one or more of a steering wheel, handle, brake pedal, accelerator, or throttle). The input device also may be a device directly or indirectly connecting the operator input device to a controlled element (i.e., the object in the autonomous vehicle ultimately controlled by the operator input device). For example, the control surface can be a drive control 204. A drive control generally includes a throttle 206, brake 208, accelerator 210, transmission shifter 211, or any combination thereof. A typical input device 202 is a throttle body (not depicted), which is typically connected to the throttle 206. Other example input devices 202 include a steering gear (not depicted) and tie rods (not depicted). In other embodiments, the input device can include an articulation control 212.

The system 1000 also includes one or more actuators 216 associated with the input devices 202. Typically, the actuator 216 includes an electromechanical device that drives the input device 202. In one embodiment of the invention, the actuator 216 includes one or more linkages or other mechanical transmissions 218. Generally, a linkage provides the association (e.g., physical connection) between an actuator 216 and the associated input device 202. A typical linkage is a lever and pivot joint, a typical transmission is a rack and pinion device.

The system 1000 also includes a plurality of behaviors 802 associated with the actuator 216. Generally, the behaviors are specific programs that propose an action to an arbiter. The vehicles resident arbiter(s) decide(s) which behavior is expressed based on mission priorities and sensor data. Each behavior 802 typically represents a specific recognizable action the vehicle might take. In some embodiments, the behaviors 802 include terrain feature avoidance 1002. The behaviors 802 and the terrain feature avoidance 1002 are typically software routines, but they may also include hardware configured to perform the required task.

In some embodiments, the system 1000 also includes are least one receiver 1004 for receiving at least one mode select command and at least one controller 226 in communication with the receiver 1004. The controller 226 executes a vehicle program 228 in accordance with the operator commands. For example, if the command is to enter a controlled emergency shutdown, the receiver 1004 passes this command to the controller 226. The controller 226 executes the vehicle program 228 that shuts down the vehicle. In some embodiments, the command may include a manual operation command that allows an operator to assume control of the vehicle. In this case, the vehicle control program includes an inhibitor 234 for disassociating the actuator 216 from the input device 202, thereby freeing the latter for operator control. Generally, in some embodiments, the inhibitor prohibits resassociation of the actuator 216 with the input device 202 to ensure that the system remains under manual control. In other embodiments, the vehicle control program 228 includes a predetermined time delay 232. Generally, the time delay prevents premature changes from one mode of operation to another. For example, the operator may relinquish manual control to allow the reestablishment of autonomous control. The reestablishment may be substantially instantaneous or occur after the predetermined delay. This delay helps prevent a premature or false return to autonomous control.

In other embodiments, the operator command may include an autonomous operation command, or a semi-autonomous operation command, or both. In each case, the vehicle control program 228 includes a vehicle control module 1006 that, in cooperation with the controller 226, provides instructions that control vehicle operation. The vehicle control module 1006 typically includes one or more software routines, but it may also include hardware configured to control the vehicle. In particular, the vehicle control module 1006 typically communicates with the receiver 1004 to receive commands sent to the vehicle. These received commands are typically remote transmissions, e.g., sent by an operator who is not in the vehicle. After receiving the semi-autonomous operation command, the vehicle control module 1006 typically allows the manual operation of vehicle input devices, features, or functions, but retains the autonomous control of certain aspects of the vehicle. For example, a tractor may have its speed and direction controlled via remote transmission. If an terrain feature that is an obstacle arises in the path of the vehicle, the vehicle compensates for the presence of the obstacle without requiring operator intervention, typically by relying on an obstacle avoidance behavior that runs in concert with the semi-autonomous mode.

Note that in FIGS. 1 through 10 the enumerated items are shown as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD), or both), non-volatile memory, tape, a system memory, and a computer hard drive.

From the foregoing, it will be appreciated that the systems and methods provided by the invention afford a simple and effective way to safely control a vehicle so the vehicle performs its predetermined tasks such as for example removing an operator from harm's way during a dangerous application, or for example to offer direct labor costs savings in commercial applications, in an efficient manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A vehicle, comprising:
   a drive control for receiving manual inputs from an operator input device to operate the vehicle in a manual mode;
   actuators mated to the drive control, each actuator mated to the drive control by a mechanical linkage that disassociates and reassociates the actuator and drive control, each actuator being associated with a plurality of behaviors that each propose at least one action set;
   an arbiter for:
   (a) selecting, from amongst proposals provided by the behaviors, (i) the action set having highest priority from amongst the plurality of action sets, each action set characterized by a priority and comprising a plurality of alternative actions ranked according to a corresponding plurality of preferences, and (ii) an alternative action, from the selected action set, having highest corresponding preference, and
   (b) modifying the selected alternative action based on an environmental condition around the vehicle; and
   a controller in communication with the arbiter and the actuators for operating the actuators in accordance with the modified selected alternative action.

2. The vehicle of claim 1, wherein the drive control comprises at least one of a throttle, a brake, an accelerator, and a transmission shifter.

3. The vehicle of claim 1, wherein the plurality of alternative actions comprises at least one trajectory set that includes a plurality of possible paths that the vehicle may follow.

4. The vehicle of claim 1 further comprising at least one of a localization sensor in communication with the controller, a perception sensor in communication with the controller, and a terrain map in communication with the controller.

5. The vehicle of claim 4, wherein the localization sensor is selected from the group consisting of a pitch sensor, a roll sensor, a yaw sensor, an inertial navigation system, a compass, a global positioning system, and an odometer.

6. The vehicle of claim 4, wherein the perception sensor is selected from the group consisting of a light detecting and ranging system, a stereo vision system, an infrared vision system, a radar system, and a sonar system.

7. The vehicle of claim 1 further comprising at least one adjuster in communication with the controller for adjusting at least one of a translational velocity of the vehicle and a rotational velocity of the vehicle.

8. The vehicle of claim 1, wherein the arbiter modifies the selected alternative action based on data received from a sensor.

9. The vehicle of claim 1, wherein the arbiter modifies the selected alternative action based on data received from a terrain feature map.

10. The vehicle of claim 1 further comprising an articulation control for operating equipment attached to the vehicle.

11. The vehicle of claim 10, wherein the equipment comprises a tilling apparatus.

12. The vehicle of claim 10, wherein the equipment comprises a blade.

13. The vehicle of claim 1, wherein the mechanical linkage comprises a lever and pivot joint.

14. The vehicle of claim 1, wherein the mechanical linkage comprises a rack and pinion device.

15. The vehicle of claim 1, wherein the vehicle comprises a tractor.

* * * * *